(12) United States Patent
Kawano et al.

(10) Patent No.: US 7,885,162 B2
(45) Date of Patent: Feb. 8, 2011

(54) INFORMATION RECORDING DEVICE AND METHOD, AND RECORDING CONTROL COMPUTER PROGRAM

(75) Inventors: Eisaku Kawano, Tokorozawa (JP); Masahiro Kato, Tokorozawa (JP); Akira Shirota, Tokorozawa (JP); Masahiro Miura, Tokorozawa (JP); Tohru Kanegae, Tokorozawa (JP); Shoji Taniguchi, Tokorozawa (JP); Eiji Muramatsu, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 745 days.

(21) Appl. No.: 11/795,199

(22) PCT Filed: Jan. 13, 2006

(86) PCT No.: PCT/JP2006/000368

§ 371 (c)(1), (2), (4) Date: Jul. 13, 2007

(87) PCT Pub. No.: WO2006/075698

PCT Pub. Date: Jul. 20, 2006

(65) Prior Publication Data

US 2008/0043584 A1    Feb. 21, 2008

(30) Foreign Application Priority Data

Jan. 14, 2005    (JP) .............................. 2005-008471

(51) Int. Cl.
*G11B 7/00* (2006.01)
(52) U.S. Cl. ..................... 369/94; 369/53.24; 369/275.3
(58) Field of Classification Search ................. 369/47.5, 369/47.51, 47.53, 53.26, 94, 275.3, 59.25, 369/283, 53.24
See application file for complete search history.

(56) References Cited

U.S. PATENT DOCUMENTS

| 6,795,389 | B1 * | 9/2004 | Nishiuchi et al. | ........ 369/275.3 |
| 6,904,011 | B2 * | 6/2005 | Van Woudenberg et al. | ........ 369/59.25 |
| 2002/0018438 | A1 * | 2/2002 | Tsukagoshi et al. | ........ 369/275.3 |
| 2002/0110068 | A1 * | 8/2002 | Araki et al. | ........ 369/53.24 |
| 2003/0185121 | A1 * | 10/2003 | Narumi et al. | ........ 369/47.53 |
| 2005/0013222 | A1 * | 1/2005 | Lee et al. | ........ 369/47.51 |

(Continued)

FOREIGN PATENT DOCUMENTS

EP    1 231 601 A2    8/2002

(Continued)

*Primary Examiner*—Wayne R Young
*Assistant Examiner*—Thomas D Alunkal
(74) *Attorney, Agent, or Firm*—Young & Thompson

(57) ABSTRACT

In an information recording medium including at least a first recording layer (L0 layer) capable of recording information and a second recording layer (L1 layer) capable of recording information, an information recording device (300) records information in a predetermined area (12) of the second recording layer by a laser beam which has passed through a transmission area (11) of the first recording layer. The information recording medium (300) includes recording means (302, etc.) for recording the information in the first recording layer or the second recording layer, judgment means for judging whether an unrecorded amount indicating the size of the unrecorded area in the radial direction in the transmission area is smaller than a predetermined amount, and control means used when the unrecorded area is judged to be smaller than the predetermined amount, for controlling the recording means to record information in the predetermined area.

12 Claims, 13 Drawing Sheets

U.S. PATENT DOCUMENTS

| | | | |
|---|---|---|---|
| 2005/0025013 A1* | 2/2005 | Yamamoto | 369/47.53 |
| 2005/0226133 A1* | 10/2005 | Ueki | 369/275.3 |
| 2006/0153055 A1* | 7/2006 | Suh | 369/275.1 |
| 2007/0109942 A1* | 5/2007 | Ito et al. | 369/94 |

FOREIGN PATENT DOCUMENTS

| | | |
|---|---|---|
| JP | 2000-036130 A | 2/2000 |
| JP | 2000-293947 | 10/2000 |
| JP | 2000-311346 | 11/2000 |
| JP | 2001-023237 | 1/2001 |
| JP | 2002-237050 | 8/2002 |
| WO | WO 02/056307 A1 | 7/2002 |
| WO | 2004/019326 | 3/2004 |
| WO | 2004/112007 A1 | 12/2004 |

* cited by examiner

[FIG. 1]
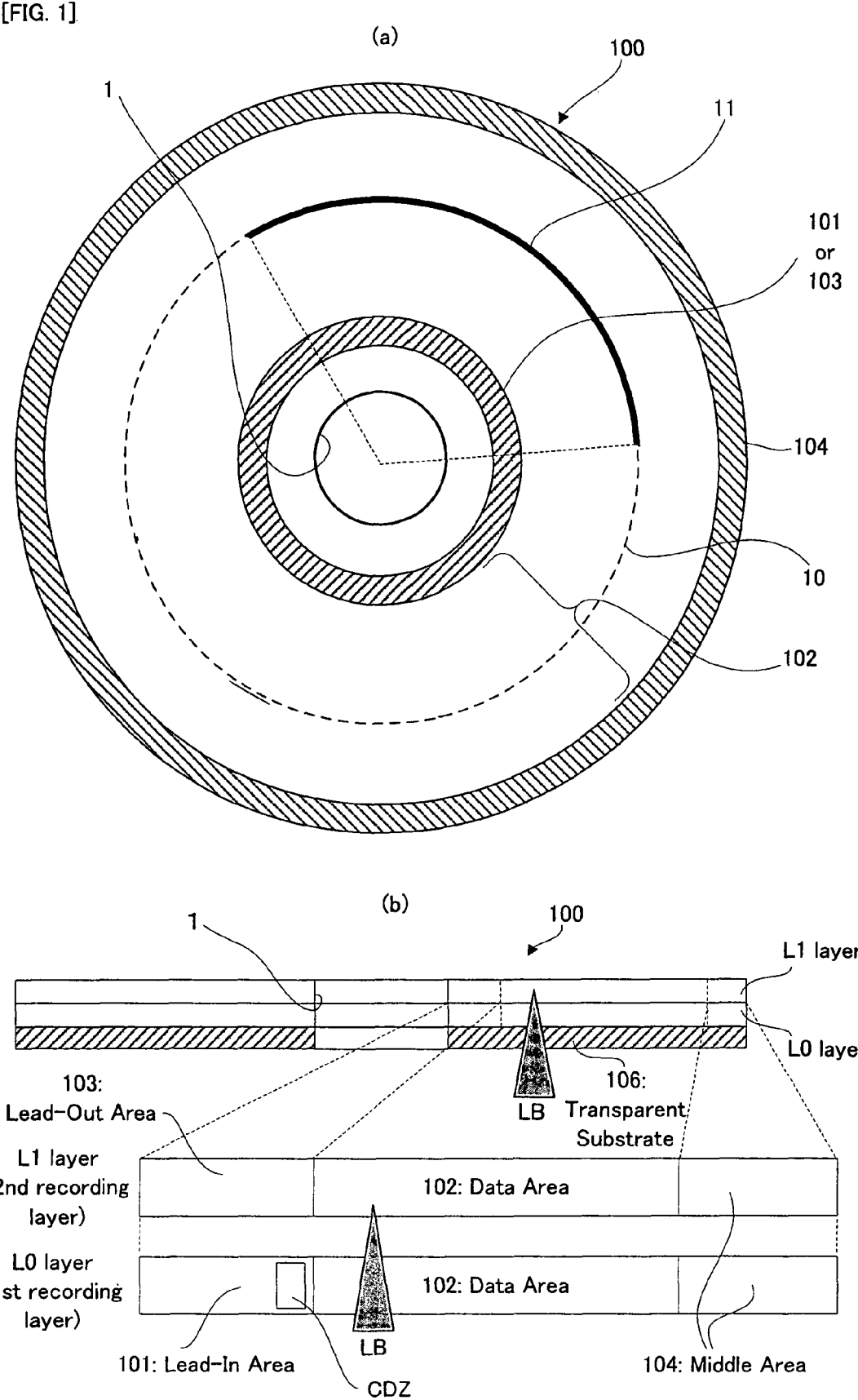

[FIG. 2]
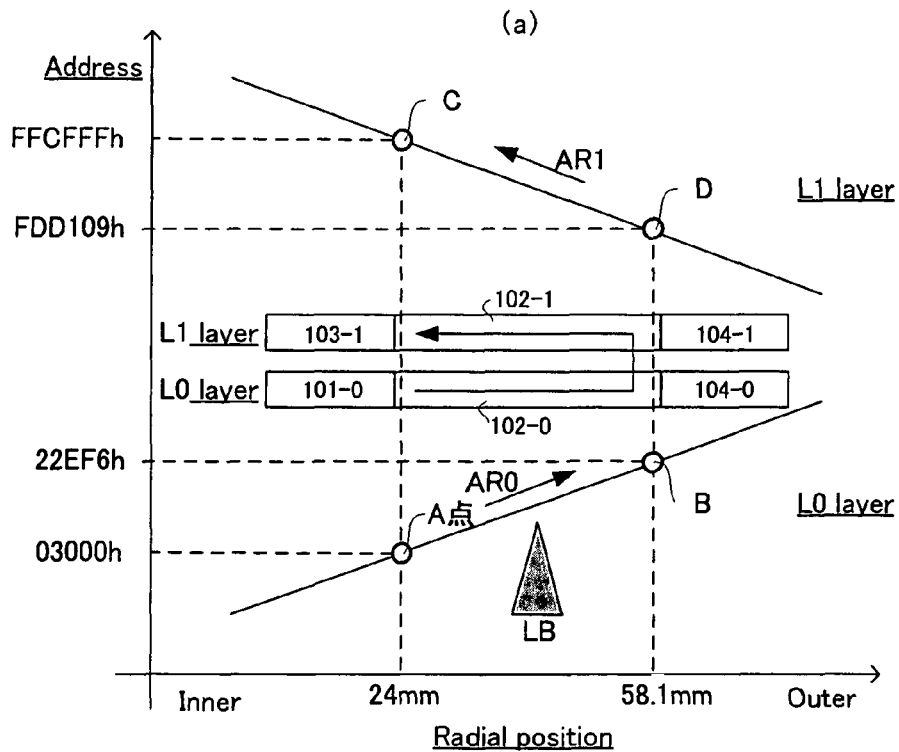
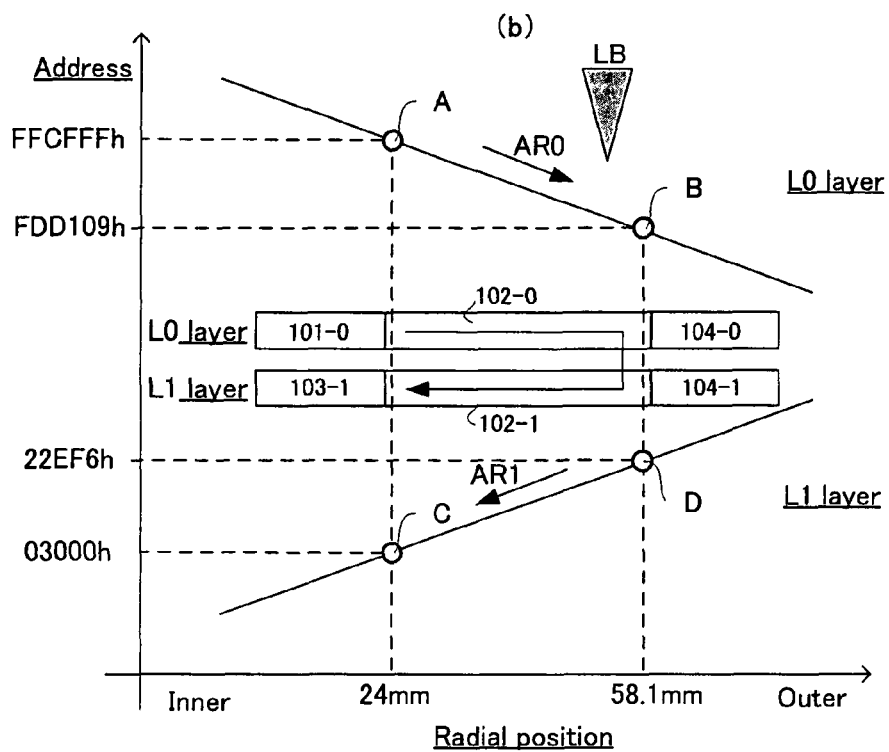

[FIG. 3]

| Address | Recorded:「1」 |
|---|---|
| 03000~03FFF | 1 |
| 04000~04FFF | 1 |
| ... | ... |
| 21000~21FFF | 1 |
| 22000~22FFF | 0 |
| ... | ... |
| FDE000~FDEFFF | 0 |
| ... | ... |
| FFC000~FFCFFF | 0 |
| ... | ... |

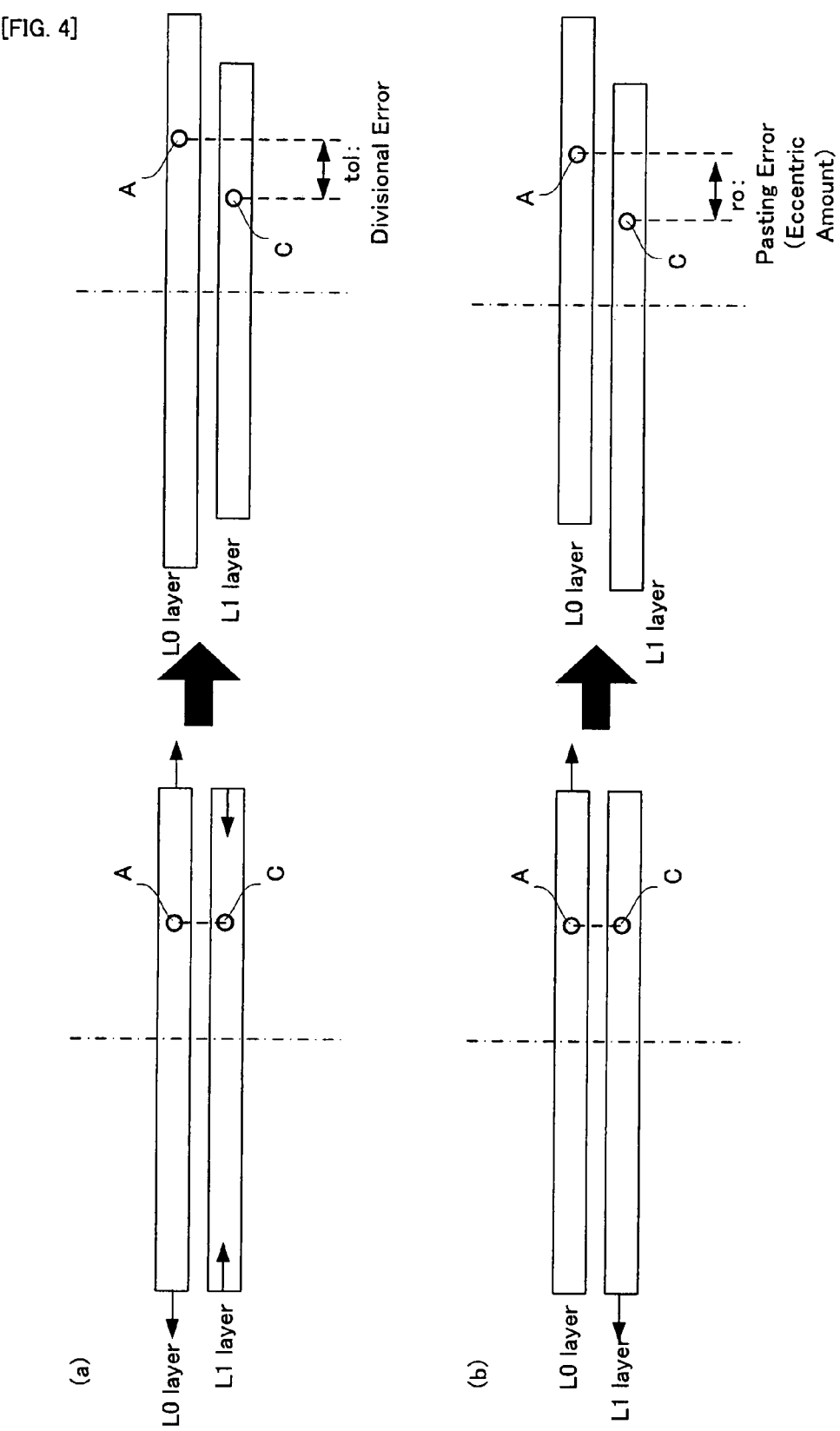
[FIG. 4]

[FIG. 5]
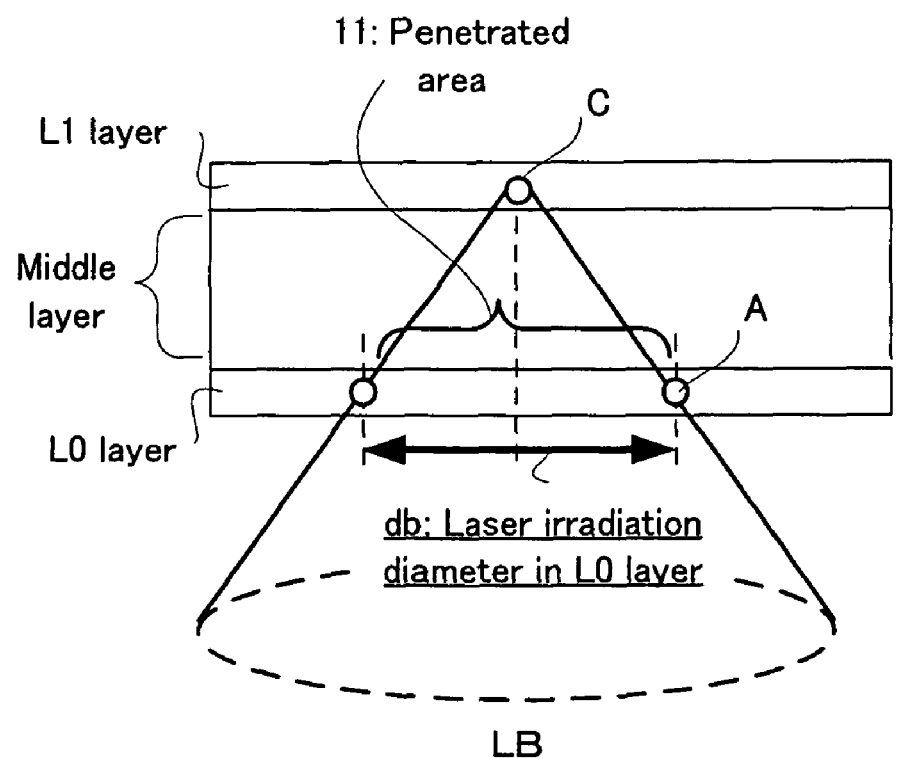
$db = 2 \times L \times \tan(\sin^{-1}(NA/n))$

[FIG. 6]
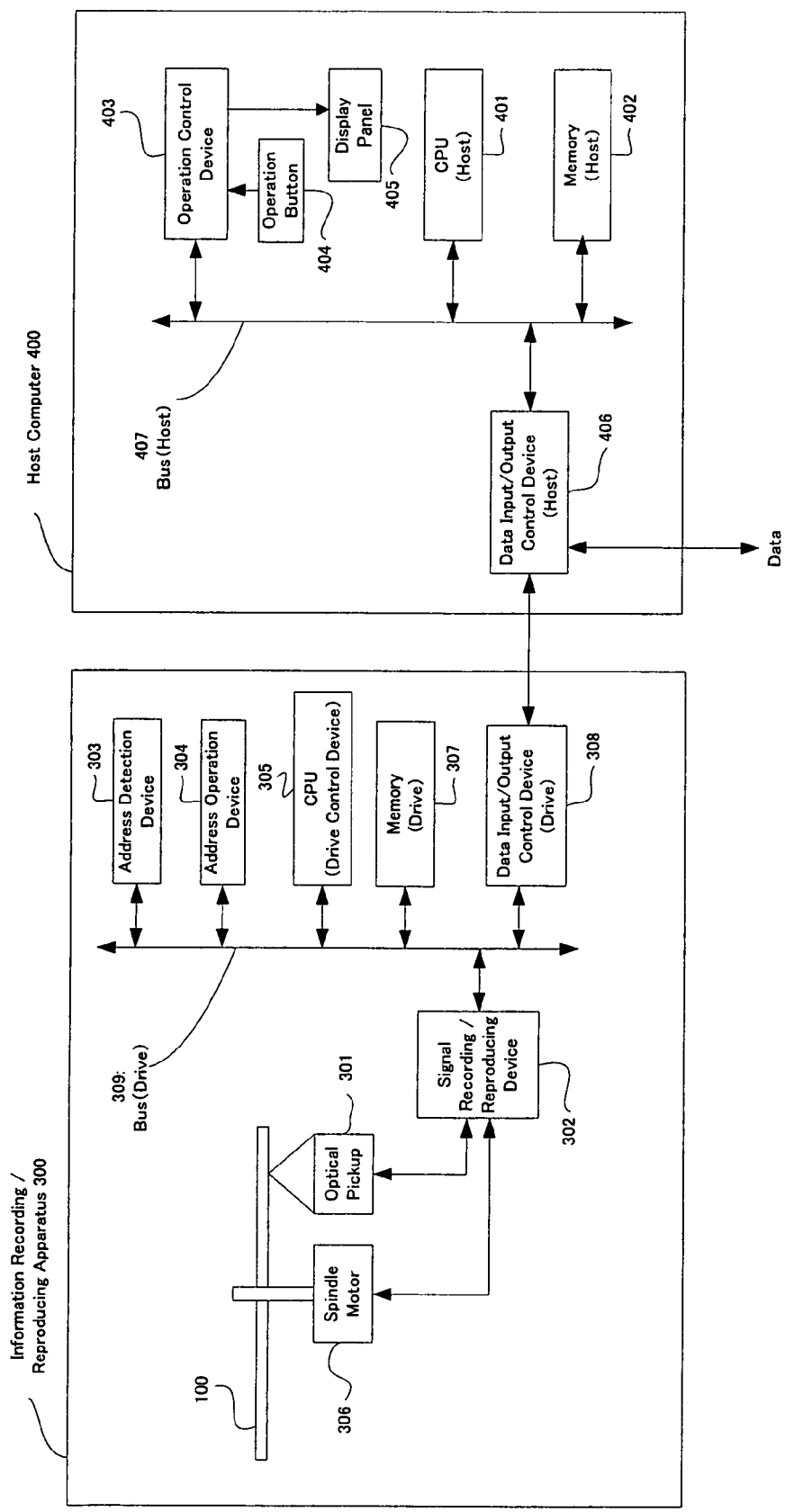

[FIG. 7]
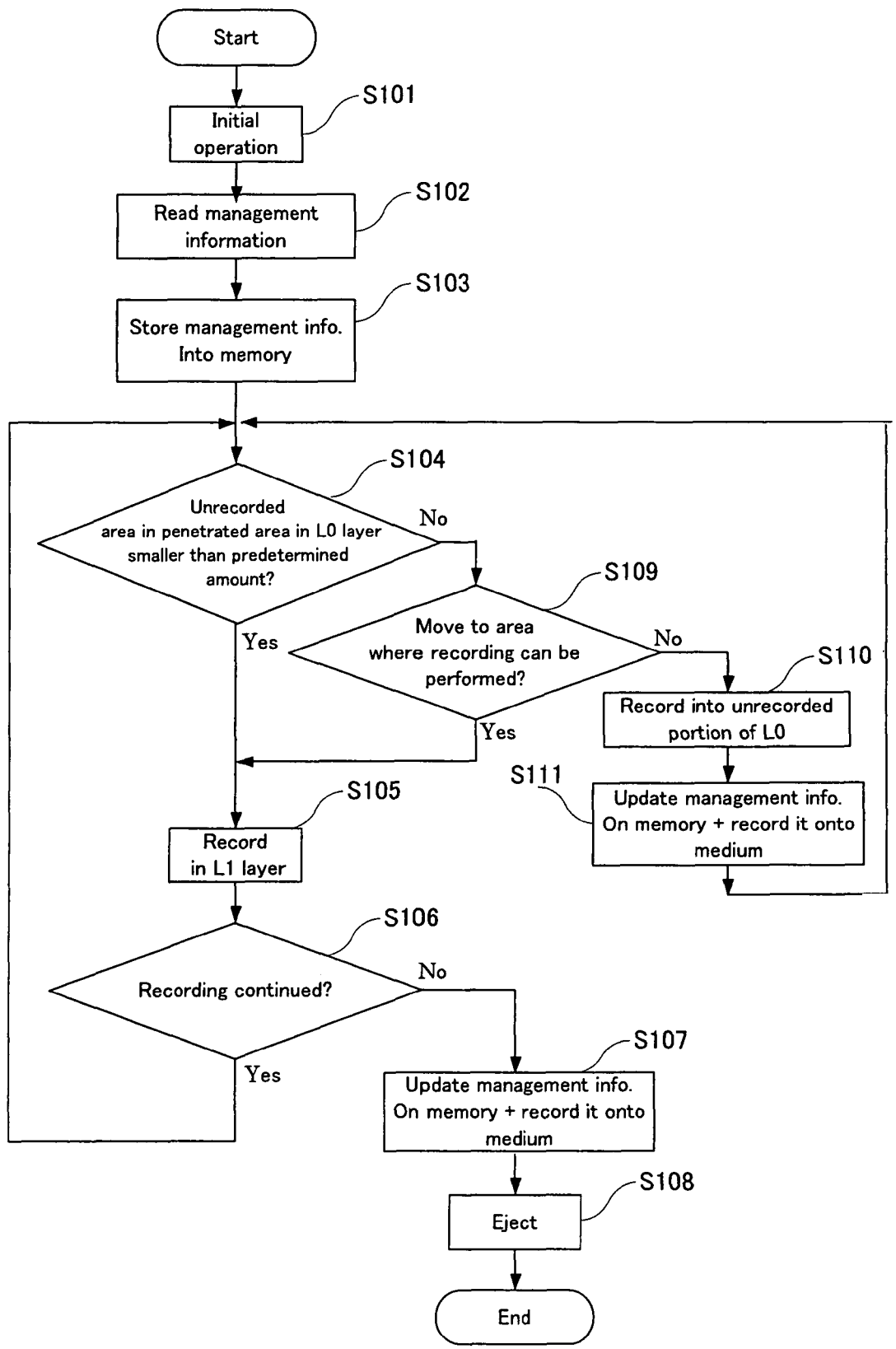

[FIG. 8]
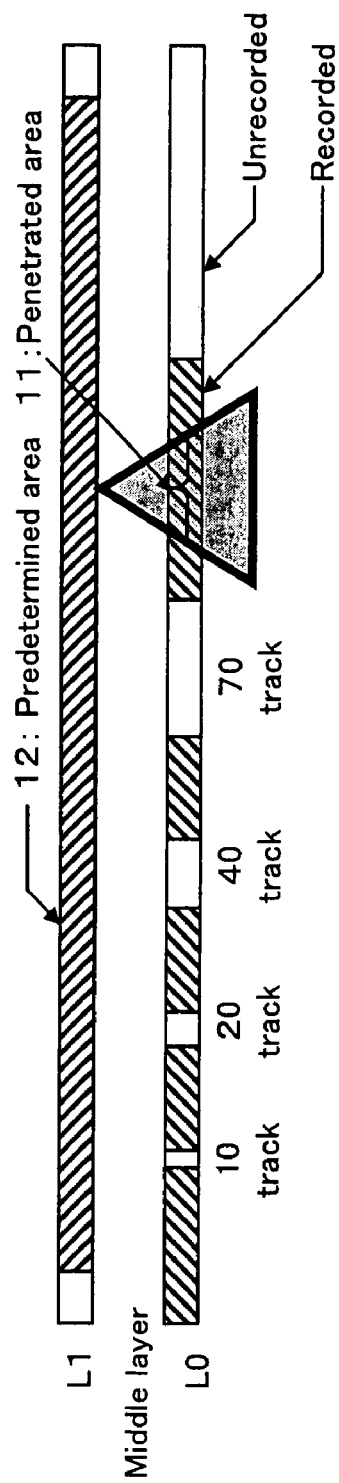

[FIG. 9]
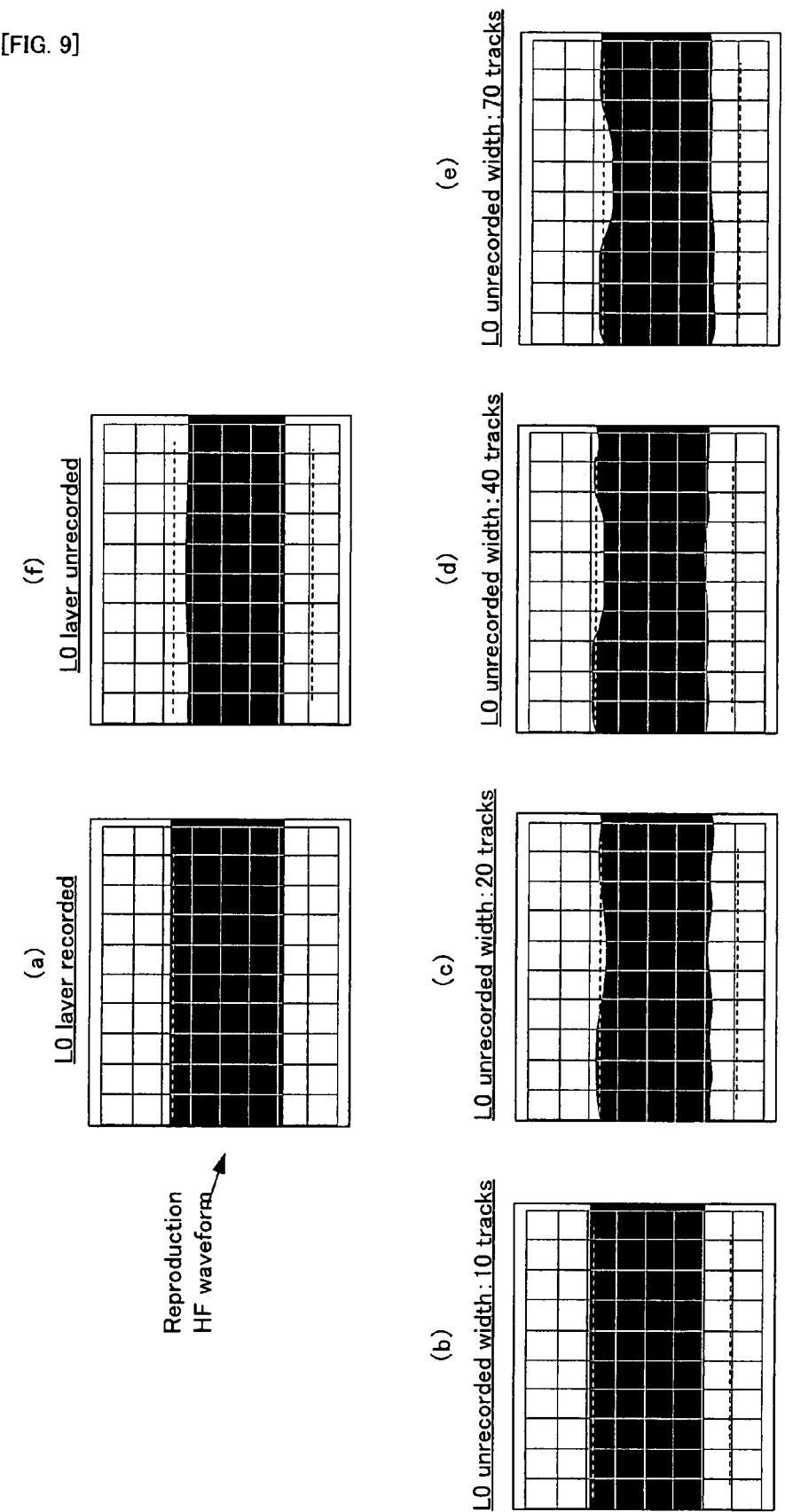

[FIG. 10]
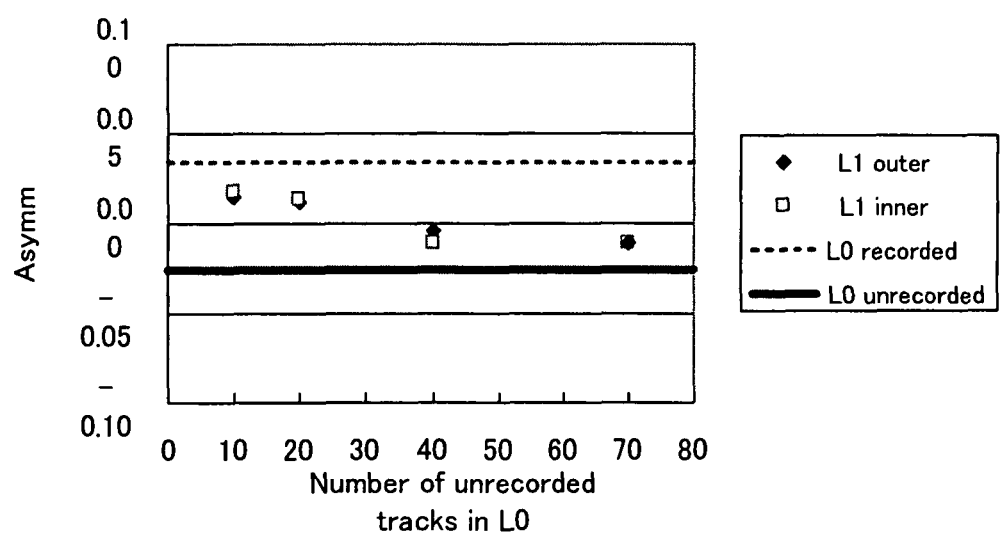

[FIG. 11]
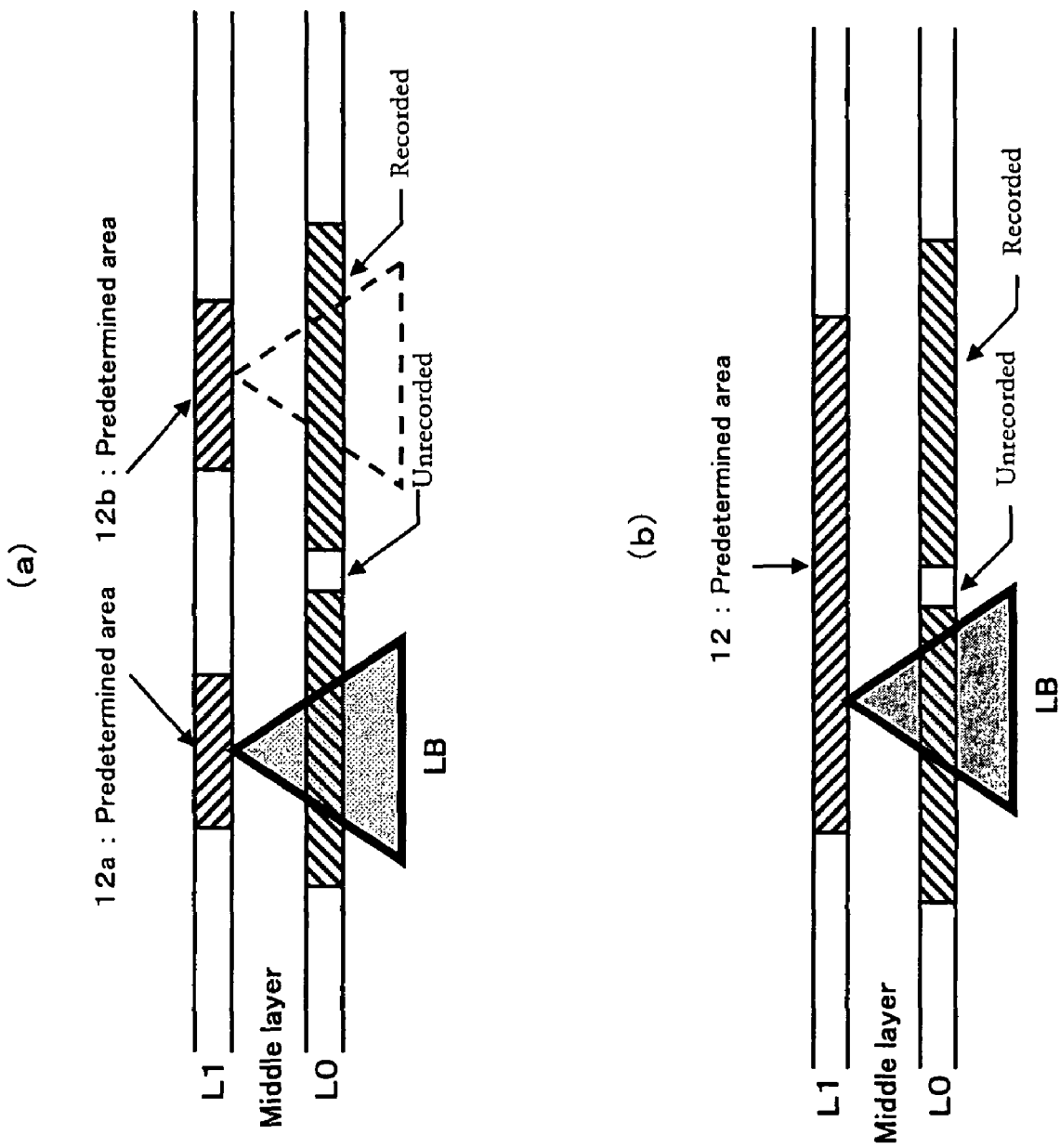

[FIG. 12]
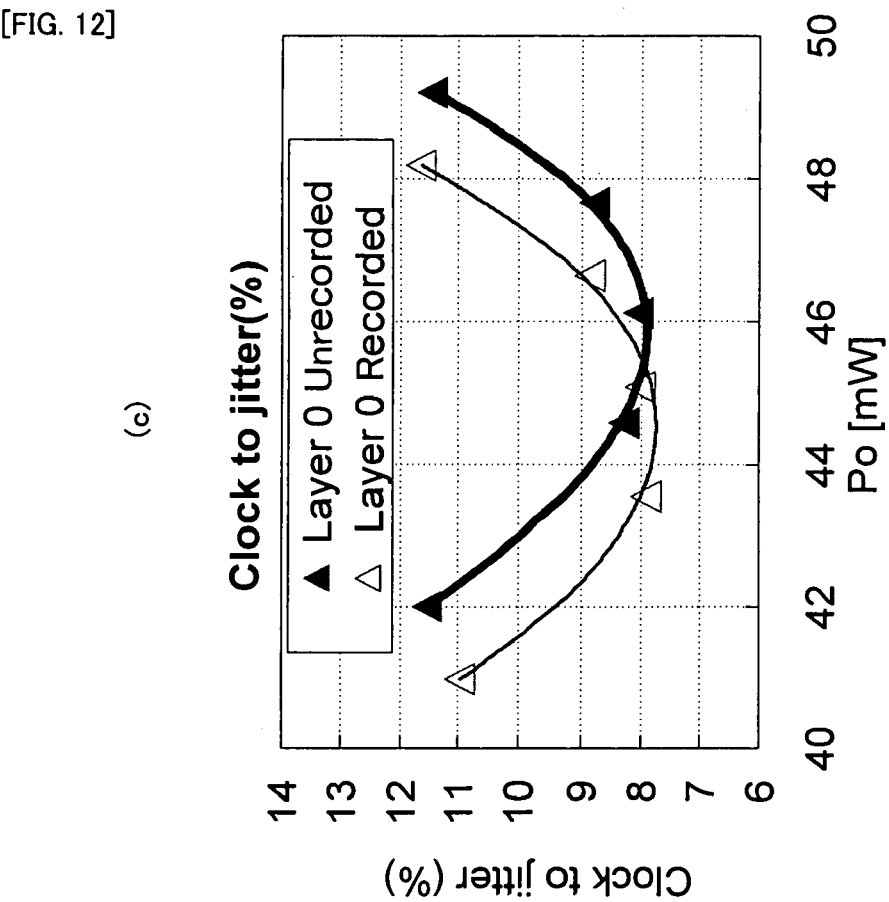
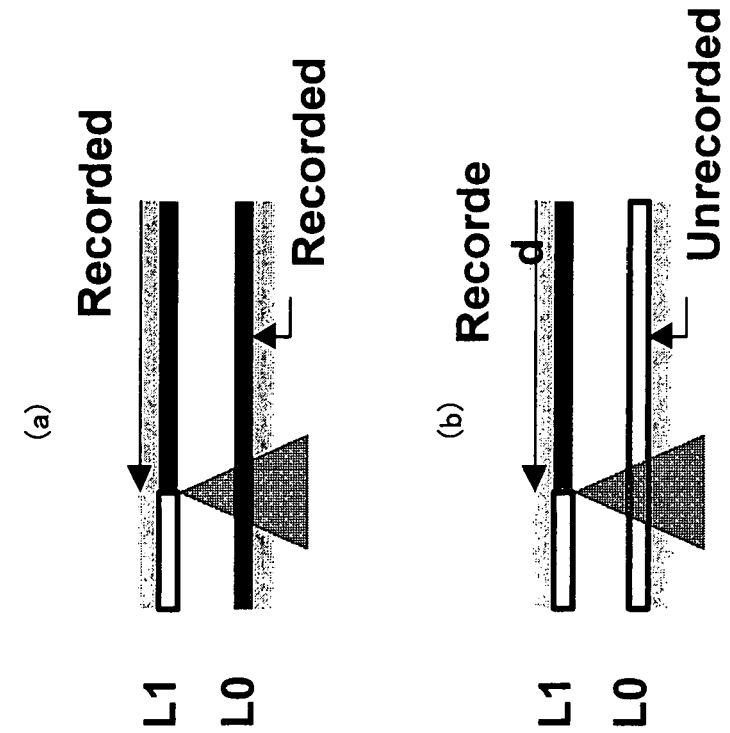

[FIG. 13]
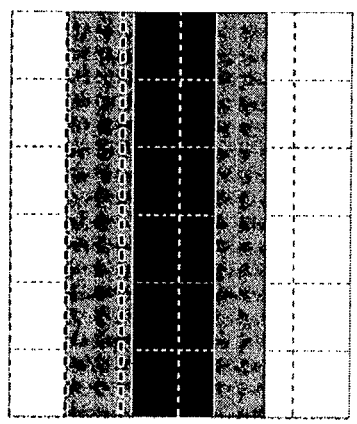
Reproduction HF waveform
Asymmetry with appropriate value
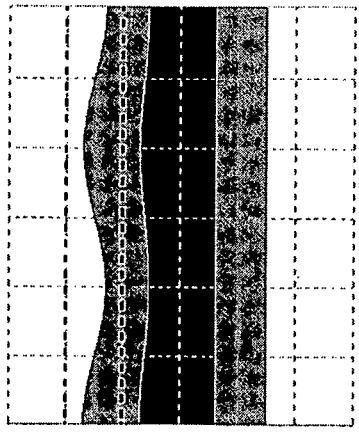
Asymmetry with value changed by influence of eccentricity
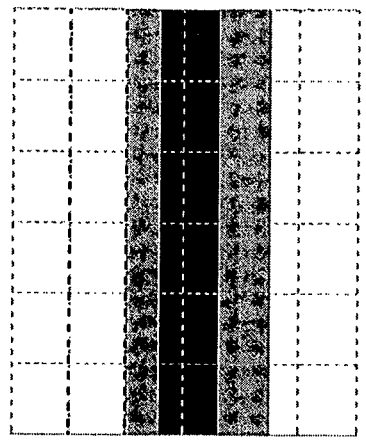
Asymmetry with value lower than appropriate value
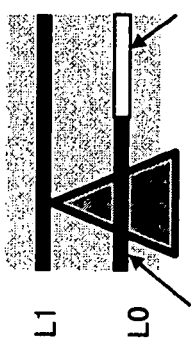
L1
L0
Unrecorded
Recorded
Record through recorded L0 area
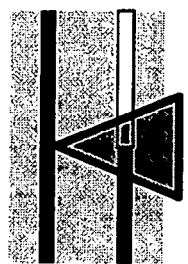
Record through Border of Recorded and Unrecorded Areas
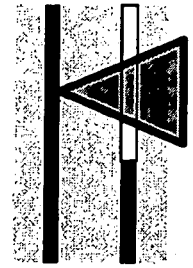
Record through Unrecorded L0 area

ID A001 US 7,885,162 B2

INFORMATION RECORDING DEVICE AND METHOD, AND RECORDING CONTROL COMPUTER PROGRAM

TECHNICAL FIELD

The present invention relates to an information recording apparatus and method, such as a DVD recorder, for recording information onto a multilayer type information recording medium, such as a two-layer type DVD and CD (Compact Disc), for example, and a computer program for recording control.

BACKGROUND ART

In an information recording medium, such as a CD-ROM (Compact Disc-Read Only Memory), a CD-R (Compact Disc-Recordable), a DVD-ROM, a DVD-R, a DVD-RW, and a DVD+R, for example, as described in patent documents 1 and 2 or the like, there is also developed an information recording medium, such as a multilayer type or dual layer type optical disc, in which a plurality of recording layers are laminated or pasted on the same substrate. Then, on an information recording apparatus, such as a DVD recorder, for performing the recording with respect to the dual layer type, i.e., two-layer type, optical disc, laser light for recording is focused or condensed on a recording layer located on the front (i.e. on the closer side to an optical pickup) as viewed from the irradiation side of the laser light (hereinafter referred to as an "L0 layer", as occasion demands) to thereby record information into the L0 layer in an irreversible change recording method by heat or a rewritable method. Moreover, the laser light is focused or condensed on a recording layer located on the rear of the L0 layer (i.e. on the farther side from the optical pickup) as viewed from the irradiation side of the laser light (hereinafter referred to as an "L1 layer", as occasion demands), through the L0 layer or the like, to thereby record information into the L1 layer.

When information is recorded into the L1 layer, which constitutes such a two-layer type optical disc, the optimum recording power of the laser light with which the L1 layer is irradiated through the recorded L0 layer, as shown in FIG. 12(a), is 44.5 (mW: milliwatt) at which a jitter value is minimal on a parabolic curve in a thin line (with white triangles) in FIG. 12(c), for example. On the other hand, the optimum recording power of the laser light with which the L1 layer is irradiated through the unrecorded L0 layer which has a different light transmittance from that of the recorded L0 layer, as shown in FIG. 12(b), is 46 (mW: milliwatt) at which a jitter value is minimal on a parabolic curve in a thick line (with black triangles) in FIG. 12(c), for example. Thus, there is a need to consider whether or not the L0 layer is recorded, in the case of the recording in the L1 layer. With respect to this, there is devised or invented a recording method in which a so-called recording order is satisfied, which is that the laser light for recording which has penetrated or transmitted the L0 layer in a recorded state is to be irradiated, for example.

The recording order is now discussed. When the information is recorded into the L1 layer, if the recording power is set to appropriately perform the recording in the case that an area in the L0 layer is in the recorded state, for example, the amplitude of a reproduction HF (High Frequency) signal is large, and appropriate or good signal quality is obtained, as shown in the left part of FIG. 13, in an area irradiated with the laser light for recording through the L0 layer in the recorded state. In other words, an asymmetry value obtained from this signal takes an appropriate value. On the other hand, as shown in the right part of FIG. 13, if the recording power is set to appropriately perform the recording in the case that the area in the L0 layer is in the recorded state, for example, the amplitude of the reproduction signal is small, and good signal quality is not obtained in an area irradiated with the laser light for recording through the L0 layer in an unrecorded state. In other words, the asymmetry value obtained from this signal takes a different value from the appropriate value, such as a low value. On the other hand, as shown in the middle part of FIG. 13, the amplitude of the reproduction signal in an area irradiated with the laser light for recording through the L0 layer in which the recorded area and the unrecorded area are mixed on a single track, varies depending on how eccentrically or disproportionately the area of the L0 layer in the recorded state or the area of the L0 layer in the unrecorded state is located from the center of the irradiation diameter of the laser light in one circle (or track), due to the extent of an eccentric amount. In other words, the asymmetry value obtained from this signal has such a feature that it transits from one to the other out of the high level and the low level. If the recording with the irradiation diameter of the laser light penetrating the L0 layer in the completely recorded state is not performed, there likely arises a problem in the reproduction.

Thus, there have been devised or invented a recording method based on the above-mentioned recording order, in such a recording condition that the recording edge of the L1 layer is set a laser irradiation radius or more away from the recording edge of the L0 layer in order to record with the irradiation diameter of the laser light penetrating the L0 layer in the completely recorded state. Specifically, the recording method is a method in which a dimensional error held by each of the L0 layer and the L1 layer, as shown in FIG. 4(a), and a pasting error in the L0 layer and the L1 layer, as shown in FIG. 4(b), are added; namely, in which a so-called margin is considered.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

However, there is a possibility that when the information is recorded into the L1 layer by the laser light which has penetrated the L0 layer, the most part or least part of an area of the L0 layer penetrated by the laser light (hereinafter referred to as a "penetrated area", as occasion demands) is in the unrecorded state.

In this case, in order to uniform the reproduction quality of the information which is recorded into the L1 layer, a place large enough to ensure an area in the recorded state, only as needed, is searched for, and the area in the recorded state is set as the penetrated area in the L0 layer. Then, the information is recorded into the L1 layer. Therefore, it is necessary to respond to the area in the recorded state or the area in the unrecorded state, which occur irregularly, in the L0 layer, so that there is such a technical problem that it is difficult to quickly and appropriately ensure the recording area which satisfies the recording order. In addition, there is also such a technical problem that this is the bottleneck of an information transfer process and this increases a time length required for the recording operation.

Alternatively, in this case, for example, the recording power of the laser light is relatively changed, in order to equalize the reproduction quality of the information recorded in the L1 layer by the laser light which has penetrated an area in the L0 layer in the recorded state and the reproduction quality of the information recorded in the L1 layer by the laser light which has penetrated an area in the L0 layer in the unrecorded state. Therefore, a complicated recording control process is needed, such as frequently changing the recording power. There is such a technical problem that the complicated recording control process cannot respond to high-speed recording and this likely causes non-uniform reproduction quality of the information recorded in the L1 layer It is therefore an object of the present invention to provide an information recording apparatus and method, which enable information to be recorded, more efficiently and quickly, even onto an information recording medium having a plurality of recording layers, for example, as well as a computer program which makes a computer function as the information recording apparatus.

Means for Solving the Subject

Information Recording Apparatus

The information recording apparatus of the present invention will be discussed hereinafter.

The above object of the present invention can be also achieved by an information recording apparatus for recording information into at least a predetermined area of a second recording layer (L1 layer) by laser light which has penetrated a penetrated area of a first recording layer (L0 layer), with respect to an information recording medium provided with at least: the first recording layer in which the information can be recorded; and the second recording layer in which the information can be recorded, the information recording apparatus provided with: a recording device for recording the information into a predetermined area in the second recording layer, by using (i) one laser light (44 mW) which maintains one feature in which appropriate reproduction quality (a minimum jitter value) can be obtained from the second recording layer if a penetrated area penetrated by the laser light is in one state (a recorded state), or (ii) another laser light (46 mW) which maintains another feature in which appropriate reproduction (a minimum jitter value) can be obtained from the second recording layer if the penetrated area is in another state (an unrecorded state); and a controlling device for controlling the recording device to record the information into the predetermined area by using the one or another laser light, on the basis of a change in a reproduction quality obtained from the second recording layer and caused by a fact that a portion in the one state and a portion in the another state are mixed in the penetrated area.

According to the information recording apparatus of the present invention, under the control of the controlling device, the recording device records the information into the predetermined area in the second recording layer, by using the one or another laser light, on the basis of a change in the reproduction quality obtained from the second recording layer and caused by the fact that the portion in the one state (the recorded state) and the portion in another state (the unrecorded state) are mixed in the penetrated area in the first recording layer.

Specifically, even if the one state, which is the most part, and another state, which is the least part, are mixed in the penetrated area, it is possible to record the information into the predetermined area by using the one laser light if it is possible to obtain the reproduction quality almost or completely equal to the reproduction quality in the case where the penetrated area is all in the one state (or is fully in the one state). On the other hand, even if the one state, which is the least part, and another state, which is the most part, are mixed in the penetrated area, it is possible to record the information into the predetermined area by using another laser light if it is possible to obtain the reproduction quality almost or completely equal to the reproduction quality in the case where the penetrated area is all in another state (or is fully in the another state). Therefore, it is possible to almost or completely eliminate an influence of the irregular occurrence of the area in the one state or another state in the first recording layer, to thereby ensure an area in which the reproduction quality of the information recorded in this area is allowed or acceptable, more efficiently.

As a result, in the recording operation based on a predetermined amount (which will described later) which is determined in accordance with the acceptable value of an amount of change which indicates a change in the reproduction quality, for example, the recording area is minimally wasted in the first and second recording layers, and the recording area can be used more efficiently.

In one aspect of the information recording apparatus of the present invention, the information recording apparatus is further provided with a judging device for judging whether or not an unrecorded amount which indicates a size of radius of an area in the unrecorded state in the penetrated area is smaller than a predetermined amount (at which the reduction of an asymmetry value can be 2 to 3% in the case of an unrecorded area of 20 tracks, for example) which indicates a size of radius of an area in the one or another state (e.g. unrecorded state) and which is determined on the basis of a change in the reproduction quality obtained from the second recording layer, and the controlling device controls the recording device to record the information into the predetermined area by using the laser light if it is judged that the unrecorded amount is smaller than the predetermined amount.

According to this aspect, by the judging device, it is judged whether or not the size of radius of an area in the unrecorded state, in the penetrated area of the first recording layer is smaller than the predetermined amount. The "predetermined amount" of the present invention herein is the size of radius of an area in unrecorded state which can exist in the penetrated area, while ensuring substantially the same reproduction quality as that in the case where the penetrated area is all in recorded state.

As a result, it is unnecessary to temporarily stop the recording operation to satisfy the recording order, to thereby reduce a time length required for the recording operation. For example, it is possible to skip the complicated recording control process, such as frequently changing the recording power, as much as possible, so that it is possible to almost or completely uniform the reproduction quality of the information recorded in the second recording layer, in the high-speed recording, for example.

In an aspect associated with the above-mentioned predetermined amount, the predetermined amount is sufficiently smaller than laser irradiation radius.

According to this aspect, it is possible to define the predetermined amount on the basis of the laser irradiation radius.

In an aspect associated with the above-mentioned controlling device, the controlling device may control the recording device to record the information into the area in the unrecorded state in the penetrated area if it is judged that the unrecorded amount is not smaller than the predetermined amount.

By such construction, it is possible to minimize a waste of the recording area in the first recording layer, in the recording operation for appropriately satisfying the recording order, and it is possible to use the recording area, more efficiently.

In an aspect associated with the above-mentioned judging device, it may be constructed such that the information recording medium has a management information recording area in which management information, which manage unrecorded state or recorded state per area unit, can be recorded, that the information recording apparatus is further provided with an obtaining device for obtaining the management information recorded in the management information recording area, and that the judging device judges whether or not the unrecorded amount is smaller than the predetermined amount, on the basis of the size of radius of the area in the unrecorded state in the penetrated area which is calculated by the obtained management information.

By such construction, the judging device can judge whether or not the unrecorded amount is smaller than the predetermined amount, more accurately and quickly, on the basis of the obtained management information.

As a result, it is possible to almost or completely uniform the reproduction quality of the information recorded in the second recording layer. In addition, it is possible to reduce a time length required for the recording operation.

Moreover, in an aspect associated with the above-mentioned management information, the information recording apparatus may be further provided with: a storing device for storing therein the management information; an updating device for updating the stored management information; and another recording device for recording the updated management information into the management information recording area.

By such construction, the management information stored in the storing device is updated by the updating device. Therefore, it is possible to reduce a time length required for the recording operation as a whole, including the updating process of the management information. Then, by said another recording device, the updated management information is recorded into the management information recording area at the same time of or before or after the updating. Therefore, it is possible to reduce a time length required for the recording operation as a whole, including the recording process of recording the management information onto the information recording medium.

In an aspect associated with the above-mentioned predetermined amount, the predetermined amount (e.g. 20 tracks) may be expressed by a data amount with a radial position in the first or second recording layer as a parameter.

By such construction, it is possible to almost or completely eliminate an influence of a change in the data amount per unit length, on the inner and outer circumferential sides of the information recording medium in a disc shape, for example.

In an aspect associated with the above-mentioned predetermined amount, it may be constructed such that the predetermined amount can be determined on the basis of at least one of (i) optical properties and recording features per an individual of the information recording medium, and (ii) variation of optical properties and recording features in a recording area of one information recording medium, and optical properties and (iii) recording features of the information recording medium influenced by various performances of the information recording apparatus.

By such construction, it is possible to make the recording operation more highly accurate, by using the predetermined amount determined on the basis of various factors.

Moreover, in an aspect associated with the above-mentioned optical properties and recording features, it may be constructed such that the recording device or the controlling device includes an optical pickup, and that the optical properties and the recording features of the information recording medium influenced by the various performances of the information recording apparatus are determined on the basis of (i) a numerical aperture (NA) of an objective lens owned by the optical pickup, (ii) a refractive index of a middle area which exists between the first recording layer and the second recording layer, and (iii) a laser irradiation diameter in the first recording layer if the laser light is focused on the second recording layer.

By such construction, it is possible to make the recording operation more highly accurate, by using the predetermined amount determined on the basis of the optical properties and the recording features of the information recording medium, which are influenced by various performances of the information recording apparatus.

In another aspect of the information recording apparatus of the present invention, a spiral or concentric first track (which can display a relationship between an address and a radial position in the first recording layer) is formed to record the information in the first recording layer of the information recording medium, and a spiral or concentric second track (which can display a relationship between an address and a radial position in the second recording layer) is formed to record the information in the second recording layer, the second track sharing a rotation center with the first track, and the controlling device controls the recording device to record the information, while setting a radial position of the predetermined area, with a predetermined margin included in a radial position of the penetrated area.

According to this aspect, under the control of the controlling device, the recording device records the information into the first recording layer, along the spiral or concentric first track which can display the relationship between the address and the radial position in the first recording layer. Simultaneously, or before or after that, under the control of the controlling device, the recording device records the information into the second recording layer, along the spiral or concentric second track which can display the relationship between the address and the radial position in the second recording layer.

Specifically, the first track may be directed from one side to the other side out of the inner and outer circumferential sides of the first or second recording layer in a disc shaped, for example, provided for the information recording medium. On the contrary, the second track may be directed from the other side to the one side. In other words, in the two-layer type or multilayer type information recording medium, continuous recording can be performed in an "opposite method" in which tracks for recording are in opposite directions in two recording layers. Therefore, if the recording is continuously performed from the end edge of the first recording layer to the start edge of the second recording layer, it is hardly or not necessary to change at all the irradiation position of the laser light on the substrate surface, in the radial direction, in changing the recording layer targeted for an information recording process or reproduction process. Thus, it is possible to perform quick layer jump (i.e. layer changing operation). This is extremely useful in practice, in the point that it facilitates uninterrupted reproduction without a special buffer function to change the recording layer, in recording the continuous record information, such as a movie, for example.

Alternatively, the first recording track may be directed from one side to the other side out of the above-mentioned inner and outer circumferential sides, and the second recording track may be also directed from the one side to the other side, as in the first recording track. In other words, in the two-layer type or multilayer type information recording medium, the continuous recording can be performed in a "parallel method" in which the recording tracks are in the same direction in the two recording layers. In the parallel method, if the recording or reproduction is ended in the first recording layer, an optical pickup, located on the most outer circumference, needs to be displaced to the most inner circumference again when the recording or reproduction is started in the second recording layer. Thus, as compared to the opposite method described above, it takes more time to change the first recording layer to the second recording layer, by that much.

In particular, according to this aspect, under the control of the controlling device, the recording device records the information, while setting the radial position of the predetermined area, with the predetermined margin included in the radial position of the penetrated area.

As a result, in the recording operation in view of the predetermined margin to appropriately satisfy the recording order, the recording area is minimally wasted in the predetermined area in the second recording layer, and the recording area can be used more efficiently.

In an aspect associated with the above-mentioned margin, a margin amount which indicates a size of the predetermined margin may be determined on the basis of at least one of (i) a dimensional error held by each of the first recording layer and the second recording layer, (ii) an eccentric amount caused by a pasting error in the first recording layer and the second recording layer, and (iii) an irradiation position error which indicates a difference (iii-1) between a second irradiation position for indicating a radial position of a focus point in the second recording layer and (iii-2) a first irradiation position for indicating a radial position of an edge of the penetrated area which is irradiated with the laser light not to focus thereon, when the laser light is irradiated to focus on the second recording layer.

By such construction, it is possible to further reduce an influence of various relative shifts, on the basis of the predetermined margin.

As a result, it is possible to set the radial position of the predetermined area in the second recording layer, more appropriately, while the recording order is appropriately satisfied. Thus, the recording area is minimally wasted in the predetermined area, and the recording area can be used, more efficiently.

In another aspect of the information recording apparatus of the present invention, the recording device (i) records the information into a first recording area in the second recording layer by the laser light which go through a recorded area in the first recording layer, based on one reproduction quality, and (ii) records the information into a second recording area in the second recording layer by the laser light which go through an unrecorded area in the first recording layer based on another reproduction quality which is substantially same as the one reproduction quality.

According to this aspect, it is possible to reduce a time length required for the reproducing control operation on the first recording area and the second recording area in the second recording layer. For example, it is possible to skip the complicated reproducing control process, such as frequently changing the reproducing power.

In another aspect of the information recording apparatus of the present invention, the reproduction quality is represented by at least one of an asymmetry value, a jitter value, and a reproduction error rate.

According to this aspect, the reproduction quality is represented by the asymmetry value and the like, by which it is possible to set the predetermined area in the second recording layer, more highly accurately and appropriately.

As a result, the recording area is minimally wasted in the predetermined area, and the recording area can be used, more efficiently.

In another aspect of the information recording apparatus of the present invention, the predetermined amount is substantially 20 tracks.

According to this aspect, it is possible to define the predetermined amount more accurately, on the basis of 20 tracks.

(Information Recording Method)

The information recording method of the present invention will be discussed hereinafter.

The above object of the present invention can be also achieved by an information recording method in an information recording apparatus for recording information into at least a predetermined area of a second recording layer (L1 layer) by laser light which has penetrated a penetrated area of a first recording layer (L0 layer), with respect to an information recording medium comprising at least: the first recording layer in which the information can be recorded; and the second recording layer in which the information can be recorded, said information recording method comprising: a recording process of recording the information in the first recording layer or the second recording layer; a judging process of judging whether or not an unrecorded amount which indicates a size of radius of an area in an unrecorded state in the penetrated area is smaller than a predetermined amount; and a controlling process of controlling said recording device to record the information into the predetermined area if it is judged that the unrecorded amount is smaller than the predetermined amount.

According to the information recording method of the present invention, it is possible to receive the various benefits owned by the above-mentioned information recording apparatus of the present invention.

Incidentally, in response to the various aspects of the information recording apparatus of the present invention described above, the information recording method of the present invention can adopt various aspects.

(Computer Program)

The computer program of the present invention will be discussed hereinafter.

The above object of the present invention can be also achieved by a computer program of instructions for recording control and for tangibly embodying a program of instructions executable by a computer provided in the above-mentioned information recording apparatus of the present invention (including its various aspects), to make the computer function as at least one portion of the recording device, the judging device and the controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one portion of the recording device and the controlling device.

According to the computer program product of the present invention, the above-mentioned information recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned information recording apparatus.

These effects and other advantages of the present invention will become more apparent from the following embodiments.

As explained above, according to the information recording apparatus of the present invention, it is provided with: the recording device; and the controlling device. According to the information recording method of the present invention, it is provided with: the recording process; and the controlling process. Therefore, in the recording operation to appropriately satisfy the recording order, the recording area is minimally wasted in the first recording layer and the second recording layer, and the recording area can be used more efficiently.

Moreover, according to the computer program of the present invention, it makes a computer function as the above-mentioned information recording apparatus of the present invention, so that it enables the information recording apparatus to minimize a waste of the recording area in the first recording layer and the second recording layer and to use the recording area more efficiently.

BRIEF DESCRIPTION OF DRAWINGS

FIG. 1 are a substantial plan view (FIG. 1(a)) showing the basic structure of an optical disc having a plurality of recording areas, in an embodiment of the information recording medium of the present invention, and a schematic cross sectional view of the optical disc and a corresponding conceptual view (FIG. 1(b)) showing a recording area structure in the radial direction.

FIG. 2 are a graph (FIG. 2(a)) showing one specific example of a relationship between an address and a radial position in an L0 layer and an L1 layer, which are related to the first recording layer and the second recording layer of the present invention, respectively, and a graph (FIG. 2(b)) showing another specific example.

FIG. 3 is a table schematically showing a space bit map, which is one specific example of the management information of the present invention.

FIG. 4 are a schematic diagram (FIG. 4(a)) conceptually showing a dimensional error held by each of the L0 layer and the L1 layer, which are respectively related to the first recording layer and the second recording layer of the present invention, and a schematic diagram (FIG. 4(b)) conceptually showing an eccentric amount caused by a pasting error in the L0 layer and the L1 layer.

FIG. 5 is a schematic diagram conceptually showing an irradiation diameter where laser light is irradiated in the L1 layer, which is related to the second recording layer, and an irradiation diameter where the laser light is irradiated in the L0 layer, which is related to the first recording layer.

FIG. 6 is a block diagram showing the basic structures of an information recording/reproducing apparatus in an embodiment of the information recording apparatus of the present invention, and a host computer.

FIG. 7 is a flowchart showing a recording operation by the information recording/reproducing apparatus, according to the embodiment of the information recording apparatus of the present invention.

FIG. 8 is a schematic diagram showing a predetermined amount of the present invention and a position relationship between the L0 layer and the L1 layer.

FIG. 9 are waveform diagrams showing a relationship between the predetermined amount of the present invention and reproduction quality, such as an asymmetry value.

FIG. 10 is a graph showing a specific example of the relationship between the predetermined amount of the present invention and the reproduction quality, such as an asymmetry value.

FIG. 11 are a schematic diagram (FIG. 11(a)) showing a recording area in the case where two predetermined areas 12a and 12b are formed by the recording order if there is a small unrecorded area in the L0 layer in a comparison example, and a schematic diagram (FIG. 11(b)) showing a recording area in the case where one predetermined area is formed by the recording order on the basis of the predetermined amount of the present invention determined in accordance with the acceptable value of an amount of change which indicates a change in the reproduction quality.

FIG. 12 are schematic diagrams (FIG. 12(a) and FIG. 12(b)) conceptually showing the recording order of the present invention, and a graph (FIG. 12(c)) numerically showing the recording order.

FIG. 13 is a schematic diagram showing problems in the comparison example.

DESCRIPTION OF REFERENCE CODES 11 penetrated area
12 predetermined area
100 optical disc
101 lead-in area
102 data area
103 lead-out area
104 middle area
300 information recording/reproducing apparatus
302 signal recording/reproducing apparatus
305 CPU (drive control device)
LB laser light
CDZ control data zone

BEST MODE FOR CARRYING OUT THE INVENTION

Hereinafter, the best mode for carrying out the present invention will be discussed in order for each embodiment, with reference to the drawings.

(1) Information Recording Medium

At first, with reference to FIG. 1 to FIG. 5, the embodiment of the information recording medium of the present invention will be discussed in detail.

Incidentally, in an optical disc in the embodiment, an opposite method is applied, as one specific example of a recording method, in which the track path of the L0 layer which constitutes one example of the "first track" of the present invention and the track path of the L1 layer which constitutes one example of the "second track" of the present invention have opposite recording directions. Moreover, it is obvious that a parallel method may be also applied in the embodiment.

Moreover, the recording power of the laser light in the embodiment is an optimum recording power in the case where the L1 layer is irradiated with the laser light through the recorded L0 layer. In the present invention, however, it is obvious that the recording power of the laser light may be an optimum recording power in the case where the L1 layer is irradiated with the laser light through the unrecorded L0 layer which has different light transmittance from that of the recorded L0 layer.

(1-1) Basic Structure

At first, with reference to FIG. 1(a) and FIG. 1(b), the basic structure of an optical disc according to the embodiment of the recording medium of the present invention will be discussed. FIG. 1(a) is a substantial plan view showing the basic structure of an optical disc having a plurality of recording areas in the embodiments of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101 or a lead-out area 103; a data area 102; and a middle area 104, with a center hole 1 as the center. Then, for example, on a transparent substrate 106 of the optical disc 100, there are laminated recording layers, such as an L0 layer and an L1 layer. In each recording area of the recording layers, tracks 10, such as groove tracks and land tracks, are alternately placed, spirally or concentrically, with the center hole 1 as the center. On the track 10, data is divided and recorded by a unit of ECC block 11. The ECC block 11 is a data management unit by which record information is error-correctable.

In particular, the lead-in area 101 is provided with a control data zone CDZ which constitutes one example of the "management information recording area" of the present invention. The "management information" of the present invention is recorded into the control data zone CDZ. Incidentally, the management information will be discussed later.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

The optical disc 100 in the embodiment, as shown in FIG. 1(b), has such a structure that the L0 layer and the L1 layer, which constitute one example of the "first and second record layers" of the present invention as descried later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the lower side to the upper side in FIG. 1(b). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Incidentally, a recording/reproducing procedure in the opposite method on the two-layer type optical disc and the like will be discussed later.

(1-2) Address and Radial Position

Next, with reference to FIG. 2, an address and a radial position on a two-layer type optical disc according to the embodiment of the information recording medium of the present invention will be discussed. FIG. 2 are a graph (FIG. 2(a)) showing one specific example of a relationship between the address and the radial position in the L0 layer and the L1 layer, which are related to the first recording layer and the second recording layer of the present invention, respectively, and a graph (FIG. 2(b)) showing another specific example. Incidentally, the horizontal axis in FIG. 2(a) and FIG. 2(b) indicates a position in the radial direction, and the vertical axis indicates an address.

As shown in FIG. 2(a) and FIG. 2(b), in one and another specific examples of the relationship between the address and the radial position in the L0 layer and the L1 layer, which are related to the first recording layer and the second recording layer of the present invention, respectively, the relationship between the address and the radial position is defined on the basis of the opposite method. The opposite method herein is, more specifically, such a method that the optical pickup of an information recording/reproducing apparatus described later is displaced from the inner to the outer circumferential side, i.e. in the right direction of an arrow AR0 in FIG. 2(a) and FIG. 2(b), in the L0 layer as the recording or reproducing procedure of the two-layer type optical disc, while the optical pickup is displaced from the outer to the inner circumferential side, i.e. in the left direction of an arrow AR1 in FIG. 2(a) and FIG. 2(b), in the L1 layer, to thereby perform the recording or reproduction on the two-layer type optical disc. In the opposite method, if the recording or reproduction is ended in the L0 layer, the optical pickup, located on the most outer circumference, does not need to be displaced again to the most inner circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel method. This is why the opposite method is broadly adopted in the recording of large volumes of content information.

(1-2-1) Increasing Address and Radial Position

In one specific example of the relationship between the address and the radial position in the L0 layer and the L1 layer, which are related to the first recording layer and the second recording layer of the present invention, respectively, the address increases in the address system based on the above-mentioned opposite method. Incidentally, in one specific example, the laser light LB is irradiated from the lower side to the upper side, and the transit of the address in the L0 layer is illustrated in a straight line in the lower part, and the transit of the address in the L1 layer is illustrated in a straight line in the upper part.

Specifically, as shown in FIG. 2(a), at first, in the L0 layer, as the laser light irradiated from the optical pickup is displaced in the lead-in area 101-0, the data area 102-0, and the middle area 104-0, from the inner to the outer circumferential side, the address in the recording area of the optical disc 100 increases. More specifically, the focal point of the laser light is displaced to the outer circumferential side from the start position (an A point in FIG. 2(a)) of the data area 102-0 in the L0 layer with an address of "03000h" and at a radial position of "24 (mm)". Then, the focal point of the laser light is displaced to the end position (a B point in FIG. 2(a)) of the data area 102-0 in the L0 layer with an address of "22EF6h" and at a radial position of "58.1 (mm)", to thereby record or reproduce the information recorded in the data area 102-0 in the L0 layer.

On the other hand, in the L1 layer, the laser light is displaced in the middle area 104-1, the data area 102-1, and the lead-out area 103-1 from the outer to the inner circumferential side, the address in the recording area of the optical disc 100 increases. More specifically, the focal point of the laser light is displaced to the inner circumferential side from the start position (a D point in FIG. 2(a)) of the data area 102-1 in the L1 layer with an address of "FDD109h" and at a radial position of "58.1 (mm)". Then, the focal point of the laser light is displaced to the end position (a C point in FIG. 2(a)) of the data area 102-1 in the L1 layer with an address of "FFCFFFh" and at a radial position of "24 (mm)", to thereby record or reproduce the information recorded in the data area 102-1 in the L1 layer.

(1-2-2) Decreasing Address and Radial Position

In another specific example of the relationship between the address and the radial position in the L0 layer and the L1 layer, which are related to the first recording layer and the second recording layer of the present invention, respectively, the address decreases in an address system based on the above-mentioned opposite method. Incidentally, in another specific example, the laser light LB is irradiated from the upper side to the lower side, and the transit of the address in the L0 layer is illustrated in a straight line in the upper part, and the transit of the address in the L1 layer is illustrated in a straight line in the lower part.

Specifically, as shown in FIG. 2(b), at first, in the L0 layer, as the laser light irradiated from the optical pickup is displaced in the lead-in area 101-0, the data area 102-0, and the middle area 104-0, from the inner to the outer circumferential side, the address in the recording area of the optical disc 100 decreases. More specifically, the focal point of the laser light is displaced to the outer circumferential side from the start position (an A point in FIG. 2(b)) of the data area 102-0 in the L0 layer with an address of "FFCFFFh" (expressed in hexadecimal numeral) and at a radial position of "24 (mm)". Then, the focal point of the laser light is displaced to the end position (a B point in FIG. 2(b)) of the data area 102-0 in the L0 layer with an address of "FDD109h" and at a radial position of "58.1 (mm)", to thereby record or reproduce the information recorded in the data area 102-0 in the L0 layer.

On the other hand, in the L1 layer, the laser light is displaced in the middle area 104-1, the data area 102-1, and the lead-out area 103-1 from the outer to the inner circumferential side, the address in the recording area of the optical disc 100 decreases. More specifically, the focal point of the laser light is displaced to the inner circumferential side from the start position (a D point in FIG. 2(b)) of the data area 102-1 in the L1 layer with an address of "22EF6h" and at a radial position of "58.1 (mm)". Then, the focal point of the laser light is displaced to the end position (a C point in FIG. 2(b)) of the data area 102-1 in the L1 layer with an address of "03000h" and at a radial position of "24 (mm)", to thereby record or reproduce the information recorded in the data area 102-1 in the L1 layer.

Incidentally, the value of the address at a point at one radial position in the L0 layer, related to the first recording layer of the present invention, and the value of the address at a point at one radial position the L1 layer, related to the second recording layer of the present invention, have such a relationship that bits are inverted to each other, i.e. a complement number relationship. Moreover, in the present invention, the complement number relationship is defined by a function of "Inv(x)" which indicates a complement number, as described later. Moreover, as one specific example of the address in the L0 layer and the L1 layer, an ECC block address, which is used as a land pre pit (LPP) address, for example, is applied; however, it is obvious that a so-called sector number may be applied.

(1-3) One Specific Example of Management Information

Next, with reference to FIG. 3, one specific example of the management information of the present invention will be discussed. FIG. 3 is a table schematically showing a space bit map, which is one specific example of the management information of the present invention.

As shown in FIG. 3, the space bit map, which is one specific example of the management information of the present invention, is provided with: an address; and a flag which indicates the recorded state or the unrecorded state.

Specifically, a flag "1" which indicates the recorded state is set in an area with addresses of "03000h" to "03FFFh". Moreover, the flag "1" which indicates the recorded state is also set in an area with addresses of "04000h" to "04FFFh" and an area with addresses of "21000h" to "21FFFh".

On the other hand, a flag "0" which indicates the unrecorded state is set in an area with addresses of "22000h" to "22FFFh", an area with addresses of "FDE000h" to "FDEFFFh", and an area with addresses of "FFC000h" to "FFCFFFh".

(1-4) Relative Shift

Next, three types of specific examples of a relative shift caused on the two-layer type optical disc provided with the L0 layer and the L1 layer, which are related to the first recording layer and the second recording layer of the present invention, respectively, will be discussed with reference to FIG. 4 and FIG. 5. FIG. 4 are a schematic diagram (FIG. 4(a)) conceptually showing a dimensional error held by each of the L0 layer and the L1 layer, which are related to the first recording layer and the second recording layer of the present invention, and a schematic diagram (FIG. 4(b)) conceptually showing an eccentric amount caused on the basis of a pasting error in the L0 layer and the L1 layer. FIG. 5 is a schematic diagram conceptually showing an irradiation diameter where laser light is irradiated in the L1 layer, which is related to the second recording layer, and an irradiation diameter where the laser light is irradiated in the L0 layer, which is related to the first recording layer At first, with reference to FIG. 4, the "dimensional error (or measuring error)" and the "eccentric amount" of the present invention will be discussed.

(1-4-1) Dimensional Error

As shown in FIG. 4(a), each of the L0 layer and the L1 layer, which constitute the two-layer type optical disc, holds the dimensional error, as the relative shift. The "dimensional error" herein is an error between the address and the radial position held by each of the L0 layer and the L1 layer independently of each other, and it is an amount caused as the deviation between an absolute radial position at a reference address in the L0 layer and an absolute radial position at a reference address in the L1 layer, when the L0 layer and the L1 layer are pasted.

Specifically, the dimensional error is caused by each of the various processes which constitute a manufacturing process. In other words, the L0 layer and the L1 layer are manufactured by the injection molding of resin materials in a stampa which is prepared on the basis of an original disc produced by a cutting machine. Therefore, (i) there is a possibility that the original disc itself holds a radial error due to the error of the radial position of the cutting machine and the variations of the track pitch, or the like, in producing the original disc. (ii) There is a possibility that the individual difference of the optical disc other than its acceptable range or tolerance may be the radial error in thermal contraction upon the injection molding. (iii)

Since the L0 layer and the L1 layer are separately prepared by different stampas, there is a possibility that the deviation of a track pitch in each recording layer may be included.

Specifically, a dimensional error tol is expressed by a difference between the radial position of the start position (A point) of the data area 102-0 in the L0 layer with the address of "03000h", shown in FIG. 2(*a*) described above, and the radial position of the end position (C point) of the data area 102-1 in the L1 layer with the address of "FFCFFFh" and at the radial position of "24 mm". Then, the acceptable range or tolerance of the dimensional error tol is equal to or less than "20 μm" in the positive direction or in the negative direction, in the L0 layer, and it is also equal to or less than "20 μm" in the positive direction or in the negative direction, in the L1 layer. Thus, that means it is allowed to hold it by "40 μm" in total, in each individual of the two-layer type optical disc.

(1-4-2) Pasting Error (Eccentric Amount)

As shown in FIG. 4(*b*), in the two-layer type optical disc, there is a possibility that an eccentric amount due to an error in pasting the L0 layer and the L1 layer, i.e. a so-called pasting error, is caused, as the relative shift. The "eccentric amount" herein is unrelated to the dimensional error held by each of the L0 layer and the L1 layer, and it is an amount caused as the deviation between an absolute radial position at a reference address in the L0 layer and an absolute radial position at a reference address in the L1 layer, when the L0 layer and the L1 layer are pasted.

Specifically, an eccentric amount ro is expressed by a difference between the radial position of the start position (A point) of the data area 102-0 in the L0 layer with the address of "03000h", shown in FIG. 2(*a*) described above, and the radial position of the end position (C point) of the data area 102-1 in the L1 layer with the address of "FFCFFFh" and at the radial position of "24 mm". Then, the acceptable range or tolerance of the eccentric amount ro is equal to or less than "20 μm" in the positive direction or in the negative direction, in the L0 layer, and it is equal to or less than "30 μm" in the positive direction or in the negative direction, in the L1 layer. That means it is allowed to hold it by "50 μm" in total, in each individual of the two-layer type optical disc.

As a result, it can be said that there is a possibility that the deviation between the absolute radial position at the reference address in the L0 layer and the absolute radial position at the reference address in the L1 layer, may take a value of "90 μm" in the positive direction or in the negative direction, on the basis of the two types of relative shifts caused on the two-layer type optical disc provided with the L0 layer and the L1 layer described above.

(1-4-3) Laser Irradiation Diameter

As shown in FIG. 5, the "laser light diameter" of the present invention will be discussed.

As shown in FIG. 5, in the two-layer type optical disc, the laser irradiation diameter varies in the L0 layer and the L1 layer due to the fact that the beam shape of the laser light is a cone. The "laser irradiation diameter db" herein is a diameter of an area in which the L0 layer is irradiated with the laser light defocused when the laser light is focused on the L1 layer (C point). Incidentally, from the radial position of the "C point" which is the focus point to the radial position of the "A point" indicates the radius of the laser irradiation diameter. In particular, the laser irradiation diameter db is expressed by the following equation (10).

$$db = 2 \times L \times \tan < \sin^{-1}(NA/n) > \qquad (10)$$

wherein,

L: thickness of a middle layer (a layer inserted between the L0 layer and the L1 layer)

NA: numerical aperture in optical system n: refractive index

Incidentally the function (sin−1) is a reverse function of (sin).

More specifically, the laser irradiation diameter db is calculated on the basis of (i) the numerical aperture (NA) of the laser light, (ii) the refractive index of the middle area which exists between the L0 layer and the L1 layer, and (iii) the thickness of the middle area which determines the interlayer distance of the L0 layer and the L1 layer.

(2) Information Recording Apparatus of Present Invention

Next, with reference to FIG. 6 to FIG. 9, a detailed explanation will be given to the basic structure and the operation principle of the information recording apparatus in the embodiment of the present invention. Particularly, in the embodiment, the information recording apparatus of the present invention is applied to an information recording/reproducing apparatus for the optical disc.

(2-1) Basic Structure

At first, with reference to FIG. 6, the basic structure of an information/reproducing apparatus 300 according to the embodiment of the information recording apparatus of the present invention, and a host computer 400 will be discussed. FIG. 6 is a block diagram showing the basic structures of the information recording/reproducing apparatus according to the embodiment of the information recording apparatus of the present invention, and the host computer. Incidentally, the information recording/reproducing apparatus 300 has a function of recording the record data onto the optical disc 100 and a function of reproducing the record data recorded on the optical disc 100.

With reference to FIG. 6, the inner structure of information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit) 305 for the drive.

The information recording/reproducing apparatus 300 is provided with: the optical disc 100; an optical pickup 301; a signal recording/reproducing device 302; an address detection device 303; an address operation device 304; the CPU (drive control device) 305; a spindle motor 306; a memory 307; a data input/output control device 308; and a bus 309.

The host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by containing the host computer 400 having a communication device, such as a modem, in the same housing. Alternatively, the CPU (host control device) 401 of the host computer 400 having a communication device, such as an i-link, may directly control the information recording/reproducing apparatus 300 through the data input/output control device 308 and the bus 309, to thereby communicate with the external network.

The optical pickup 301 is to perform the recording/reproduction with respect to the optical disc 100, and is provided with a semiconductor laser device, a lens, and the like. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 controls the optical pickup 301 and the spindle motor 306, to thereby perform the recording/reproduction with respect to the optical disc 100. More specifically, the signal recording/reproducing device 302 is provided with: a laser diode (LD) driver; a head amplifier; and the like, for example. The laser diode driver (LD driver) drives a not-illustrated semiconductor laser device located in the optical pickup 301. The head amplifier amplifies the output signal of the optical pickup 301, i.e. the reflective light of a light beam, and outputs the amplified signal. More specifically, the signal recording/reproducing device 302 drives the not-illustrated semiconductor laser device located in the optical pickup 301, in order to determine an optimum laser power by the recording and reproduction processes for an OPC (Optimum Power Control) pattern, together with a not-illustrated timing generator or the like, under the control of the CPU 305, upon an OPC process. In particular, the signal recording/reproducing device 302 constitutes one example of the "recording device" of the present invention, together with the optical pickup 301.

The address detection device 303 detects an address (address information) on the optical disc 100, from a reproduction signal, including a pre-format address signal or the like and outputted by the signal recording/reproducing device 302. Moreover, the address detection device 303 may be constructed to detect the offset information pre-recorded in the control data zone.

The address operation device 304 performs an operation or calculation, such as adding or subtracting the address offset value, with respect to the detected address.

The CPU (drive control device) 305 controls the entire information recording/reproducing apparatus 300 by giving an instruction to various controlling devices, through the bus 309. In particular, the CPU 305 determines the location of various recording areas, on the basis of the address operated or calculated by the address operation device 304. Then, the CPU 305 controls the signal recording/reproducing device 302 to record various record information into the determined various recording areas. Moreover, software or firmware for operating the CPU 305 is stored in the memory 307. In particular, the CPU 305 is one example of the "controlling device" of the present invention. Moreover, the CPU 305 may control various devices through a DSP (Digital Signal Processor).

The spindle motor 306 is intended to rotate and stop the optical disc 100, and operates upon accessing the optical disc. More specifically, the spindle motor 306 is constructed to rotate and stop the optical disc 100 at a predetermined speed, under spindle servo from a not-illustrated servo unit or the like.

The memory 307 is used in the whole data processing and the OPC process or the like on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like. In particular, the above-mentioned offset amount (shift amount), and the offset information about the address offset value or the like calculated on the basis of the offset amount (shift amount) may be stored (memorized) in the memory 307. In particular, the memory 307 (402) constitutes one example of the "storing device" for storing therein the "management information" of the present invention.

The data input/output control device 308 controls the input/output of the data from the exterior with respect to the information recording/reproducing apparatus 300, to thereby perform storage to and export from the data buffer on the memory 307. A drive control command issued from the external host computer 400 (hereinafter referred to as a "host", as occasion demands) connected to the information recording/reproducing apparatus 300 through an interface, such as a SCSI and an ATAPI, is transmitted to the CPU 305 through the data input/output control device 308. Moreover, the record/reproduction data is also transmitted and received with respect to the host computer 400 through the data input/output control device 308, in the same manner.

The CPU (host control device) 401, the memory 402, the data input/output control device 406, and the bus 407 in the host computer 400 are substantially the same the corresponding constitutional elements in the information recording/reproducing apparatus 300.

In particular, the operation control device 403 receives an operation instruction and performs display with respect to the host computer 400, and transmits an instruction by the operation button 404, such as an instruction to record or reproduce, to the CPU 401. The CPU 401 may transmit a control command to the information recording/reproducing apparatus 300, through the data input/output control device 406, on the basis of instruction information from the operation control device 403, to thereby control the entire information recording/reproducing apparatus 300. In the same manner, the CPU 401 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can be recognized, so that the CPU 401 can output the operational state of the information recording/reproducing apparatus 300 to the display panel 405, such as a fluorescent tube and an LCD, through the operation control device 403.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 402, on the CPU

401. Moreover, in another specific example, the information recording/reproducing apparatus 300 is a disc drive (hereinafter referred to as a "drive", as occasion demands), and the host computer 400 is a personal computer and a work station. The host computer, such as the personal computer, and the drive are connected through the data input/output control device 308 (406), such as the SCSI and the ATAPI, and application, such as writing software, installed in the host computer controls the disc drive.

(2-2) Operation Principle

Next, with reference to FIG. 7, as well as FIG. 8 and FIG. 9, as occasion demands, the operation principle of the information recording/reproducing apparatus according to the embodiment of the information recording apparatus of the present invention will be discussed. FIG. 7 is a flowchart showing a recording operation by the information recording/reproducing apparatus, according to the embodiment of the information recording apparatus of the present invention.

The explanation will be given in accordance with the operation procedure.

As shown in FIG. 7, at first, if the optical disc is loaded (inserted), the management information recording area, such as the control data zone, is accessed by the optical pickup, as an initial operation, under the control of the CPU 305 (step S101).

Then, under the control of the CPU 305, the management information is read which indicates the address of an area in the recorded state or the unrecorded state (step S102).

Then, under the control of the CPU 305, the read management information is stored by the storing device, such as the memory 307 (step S103).

Then, under the control of the CPU 305, it is judged, on the basis of the management information, whether or not the size of the unrecorded area in the penetrated area in the L0 layer penetrated by the laser light is smaller than the predetermined amount, in recording the information into the L1 layer (step S104). The "predetermined amount" of the present invention is the size of an area in one or another state which can exist in the penetrated area, while ensuring substantially the same reproduction quality as that in the case where the penetrated area is all in one or another state. The predetermined amount can be determined on the basis of the acceptable value of an amount of change which indicates a change in the reproduction quality. The predetermined amount can be obtained, experimentally, experientially, theoretically, or by simulation, or the like, and generally, it is sufficiently smaller than the laser irradiation diameter in the L0 layer.

Specifically, in the case of a penetrated area 11 having about 20 tracks in the unrecorded state, it is possible to substantially equate the reproduction quality of the information recorded in the L1 layer through the unrecorded area (e.g. 20 tracks) in L0 layer with that in the case where the penetrated area 11 is in a fully recorded state in the L0 layer. In other words, it is possible to prevent the reduction of the asymmetry value of the information recorded in L1 layer through the penetrated area 11 including the unrecorded area of 20 tracks, only by 2 to 3%, as compared to the asymmetry value of the information recorded in L1 layer through the penetrated area 11 which is in the fully recorded state. Thus, it is possible to substantially equate the penetrated area 11 including the unrecorded area of 20 tracks with the penetrated area 11 which is in the fully recorded state in the recording of L1 layer through the penetrated area 11.

Now, with reference to FIG. 8 to FIG. 10, one specific example of the "predetermined amount" of the present invention is discussed. FIG. 8 is a schematic diagram showing the predetermined amount of the present invention and the position relationship between the L0 layer and the L1 layer. FIG. 9 are waveform diagrams showing a relationship between the predetermined amount of the present invention and the amplitude of a reproduction HF. FIG. 10 is a graph showing the relationship between (i) the predetermined amount of the present invention and (ii) the reproduction quality, such as an asymmetry value.

As shown in FIG. 8 and FIG. 9, the predetermined amount is determined on the basis of the transit of the reproduction quality, such as the asymmetry value, which is obtained from the amplitude of the reproduction HF signal, for example, of the information recorded in the L1 layer, by using the number of tracks in the unrecorded state in a penetrated area 11 as a parameter. In other words, as shown in FIG. 9(*a*), if the penetrated area 11 is in the fully recorded state, that maximizes the amplitude of the reproduction HF signal, for example, of the information recorded in the L1 layer. On the other hand, as shown in FIG. 9(*f*), if the penetrated area 11 is in the fully unrecorded state, that minimizes the amplitude of the reproduction HF signal, for example, of the information recorded in the L1 layer. Then, from FIG. 9(*b*) to FIG. 9(*e*), the amplitude of the reproduction. HF signal transits from the maximum to the minimum, with the number of tracks in the unrecorded state as a parameter.

In addition, as shown in FIG. 10, the transit of the reproduction quality, such as the asymmetry value, of the information recorded in the L1 layer is plotted, with the number of tracks in the unrecorded state as a parameter.

As described above, on the basis of the experimental results, it can be said that in the case of the penetrated area 11 having about 20 tracks in the unrecorded state, it is possible to substantially equate the reproduction quality of the information recorded in the L1 layer though unrecorded area (e.g. 20 tracks) in L0 layer with a reproduction quality of the information recorded through a fully recorded area in the penetrated area 11 is in the fully recorded state.

Incidentally, the predetermined amount may be determined on the basis of the recording features per an individual optical disc, the variation of the recording features in the recording area of one optical disc, and the recording features of the optical disc which is influenced by the information recording apparatus including various performances of the optical pickup. The subject returns to FIG. 7 again.

Then, as a result of the judgment in the step S104, if the size of the unrecorded area in the penetrated area 11 in the L0 layer penetrated by the laser light is smaller than the predetermined amount, such as 20 tracks, in recording the information into the predetermined area 12 in the L1 layer (the step S104: Yes), the information is recorded into the predetermined area 12 in the L1 layer, under the control of the CPU 305 (step S105).

Then, under the control of the CPU 305, it is judged whether or not the recording operation is continued (step S106). If the recording operation is not continued (the step S106: No), the address of the information recorded in the L1 layer or the like is updated to the management information on the memory, and the updated management information is recorded into the management information recording area, such as the control data zone CDZ, of the optical disc (step S107).

Then, the optical disc is unloaded (ejected) (step S108).

On the other hand, as a result of the judgment in the step S104, if the size of the unrecorded area in the penetrated area 11 in the L0 layer penetrated by the laser light is not smaller, i.e. larger, than the predetermined amount, such as 20 tracks, in recording the information into the predetermined area 12 in the L1 layer (the step S104: No), it is judged whether or not to move to an area in which the recording can be performed in the L1 layer, under the control of the CPU 305 (step S109). If it is judged not to move to the area in which the recording can be performed in the L1 layer (the step S109: No), the information is recorded into the penetrated area 11 in the L0 layer, under the control of the CPU 305 (step S110).

Then, the address of the information recorded in the L0 layer or the like is updated to the management information on the memory, and the updated management information is recorded into the management information recording area, such as the control data zone CDZ, of the optical disc (step S111). Then, again, it is judged, on the basis of the management information, whether or not the size of the unrecorded area in the penetrated area 11 in the L0 layer penetrated by the laser light is smaller than the predetermined amount (the step S104).

On the other hand, as a result of the judgment in the step S109, if it is judged to move to the area in which the recording can be performed in the L1 layer (the step S109: Yes), the information is recorded after moving to the area in which the recording can be performed in the L1 layer (the step S105).

(3) One Study of Operation and Effect of Information Recording Apparatus of Present Invention Next, with reference to the above-mentioned FIG. 8 to FIG. 10, as occasion demands, in addition to FIG. 11, one study is made on the operation and effect of the information recording apparatus of the present invention. FIG. 11 are a schematic diagram (FIG. 11(*a*)) showing a recording area in the case where two predetermined areas 12*a* and 12*b* are formed by the recording order if there is a small unrecorded area in the L0 layer in a comparison example, and a schematic diagram (FIG. 11(*b*)) showing a recording area in the case where one predetermined area 12 is formed by the recording order on the basis of the predetermined amount of the present invention determined in accordance with the acceptable value of the amount of change which indicates a change in the reproduction quality of the information recorded in the L1 layer.

According to the embodiment of the information recording apparatus of the present invention, the recording is performed on the basis of the comparison judgment of (i) the size of the area in the unrecorded state, for example, in the penetrated area of the L0 layer and (ii) the predetermined amount determined in accordance with the acceptable value of an amount of change which indicates a change in the reproduction quality of the information recorded in the L1 layer, under the control of the controlling device.

If the recording based on the predetermined amount is not performed, there is a possibility that the recording area to satisfy the above-mentioned recording order is wasted lengthily. More specifically, as shown in FIG. 11(*a*), for example, in an actual recording operation, there is likely the case where small unrecorded areas are unevenly distributed in the L0 layer. In this case, in the comparison example, in order to satisfy the recording order, the recording is performed into the L1 layer, only by the laser light which has penetrated one of the recorded areas between which the unrecorded area in the L0 layer is located, not to make the laser light penetrate the unrecorded area in the L0 layer. Therefore, the recording area in the L1 layer which faces the area located on the inner circumferential side of the unrecorded area in the L0 layer and the area located on the outer circumferential side, is to be divided into the predetermined areas 12*a* and 12*b* to perform the recording in the L1 layer. Thus, there arises an area where the recording cannot be performed between the both areas, and this causes a waste of the recording area in the L1 layer.

As opposed to this, according to the embodiment of the information recording apparatus of the present invention, the recording is performed on the basis of the comparison judgment of (i) the size of the area in the unrecorded state, for example, in the penetrated area of the L0 layer and (ii) the predetermined amount determined in accordance with the acceptable value of an amount of change which indicates a change in the reproduction quality of the information recorded in the L1 layer, under the control of the controlling device.

Specifically, according to the study of the inventors of the present invention, it is known that the recording can be performed with the laser light penetrating the unrecorded area in the L0 layer, (i) if the size of the unrecorded area in the L0 layer is substantially smaller than the diameter of the laser light with which the L0 layer is irradiated and (ii) if it is an amount which satisfies (or is within a range of) the acceptable value of the amount of change which indicates a change in the reproduction quality of the information recorded in the L1 layer. More specifically, for example, as shown in the above-mentioned FIG. 8, if the information is recorded into the L1 layer with the width of the unrecorded area as a parameter, the reproduction HF waveform of the information has a waveform shape shown in FIG. 9. Reproduction features, such as the asymmetry value, in the L1 layer calculated by the reproduction HF waveform takes the value shown in FIG. 10. In other words, in the case of the unrecorded area holding a radius width of about 20 tracks in the L0 layer, it can be said that it is possible to substantially equate the reproduction quality of the information recorded in the L1 layer through the unrecorded area (e.g. 20 tracks) in the L0 layer with a reproduction quality of the information recorded in L1 layer through a fully recorded area in the L0 layer (or all recorded L0 layer). Therefore, as shown in FIG. 11(*b*), it is possible to perform the recording with respect to the L1 layer, even by the laser light which has penetrated the small unrecorded area in the L0 layer holding a radius width of about 20 tracks, for example. As a result, the recording area of the L1 layer is minimally wasted, and the recording area can be used more efficiently. That is to say, as shown by the predetermined area 12 in FIG. 11(*b*), the continuous recording is performed on more wider area in the L1 layer. As a result, the recording time and the recording area of the L1 layer is minimally wasted, and the recording area can be used more efficiently.

(4) Another Study of Operation and Effect of Information Recording Apparatus of Present Invention Next, with reference to the above-mentioned 11, in addition to FIG. 11, another study is made on the operation and effect of the information recording apparatus of the present invention.

According to the information recording apparatus of the present invention, it is judged whether or not the size of the area in the unrecorded area, for example, of the penetrated area in the L0 layer is smaller than the predetermined amount, under the control of the controlling device.

If the above-mentioned judgment is not performed, the following problem occurs. Namely, there is a possibility that when the information is recorded into the L1 layer by the laser light which has penetrated the L0 layer, the most part or least part of the penetrated area of the L0 layer penetrated by the laser light is in the unrecorded state. In this case, in order to uniform the reproduction quality of the information which is recorded into the L1 layer, a place large enough to ensure an area in the recorded state, only as needed, is searched for, subsequently or as an initial operation, and the area in the recorded state is set as the penetrated area in the L0 layer. Then, the information is recorded into the L1 layer. Therefore, it is necessary to respond to the area in the recorded state or the area in the unrecorded state, which occur irregularly, in the L0 layer, so that it is difficult to quickly and appropriately ensure the recording area which satisfies the recording order.

Alternatively, in this case, for example, the recording power of the laser light is relatively changed, in order to equalize (i) the reproduction quality of the information recorded in the L1 layer by the laser light which has penetrated an area in the L0 layer in the recorded state and (ii) the reproduction quality of the information recorded in the L1 layer by the laser light which has penetrated an area in the L0 layer in the unrecorded state. Therefore, a complicated recording control process is needed, such as frequently changing the recording power, and this increases a time length required for the recording operation. In addition, the complicated recording control process cannot respond to high-speed recording and this likely causes non-uniform reproduction quality of the information recorded in the L1 layer.

As opposed to this, according to the embodiment of the information recording apparatus of the present invention, it is judged whether or not the size of the area in another state, such as in the unrecorded state, for example, in the penetrated area of the L0 layer is smaller than the predetermined amount, under the control of the controlling device. Therefore, it is possible to almost or completely eliminate an influence of the irregular occurrence of the area in the recorded state or the unrecorded state in the L0 layer, to thereby ensure the area which appropriately satisfies the recording order, more efficiently. In addition, it is also possible to ensure the area in the L1 layer where the recording can be performed, more efficiently, by the recording operation using the laser light which has penetrated the area of the L0 layer including the predetermined amount of area determined in accordance with the acceptable value of the amount of change which indicates a change in the reproduction quality of the information recorded in the L1 layer; namely, by the recording operation based on the predetermined amount.

As a result, it is possible to minimize a waste of the recording area in the L0 layer and the L1 layer, in the recording operation for appropriately satisfying the recording order and in the recording operation based on the predetermined amount, and it is possible to use the recording area, more efficiently. Moreover, it is possible to skip the complicated recording control process, such as frequently changing the recording power, as much as possible, so that it is possible to reduce a time length required for the recording operation. In addition, for example, in the high-speed recording, the complicated recording control process is not required, so that it is possible to almost or completely uniform the reproduction quality of the information recorded in the L1 layer.

In particular, this is more effective in a recording method in which the recording is alternately performed in each constant length, in two recording areas which face or are opposed to each other in the L0 layer and the L1 layer. Specifically, as shown in the above-mentioned FIG. 11(b), it is possible to minimize a waste of the recording area between the predetermined areas 12a and 12b in the recording in the L1 layer with the laser light penetrating the small unrecorded area (e.g. 20 tracks) in the L0 layer, and it is possible to use the recording area, more efficiently especially in the L1 layer.

In the above-mentioned embodiments, the information recording/reproducing apparatus for additional recording or writing once, such as a DVD-R recorder and a DVD+R recorder, is explained as one example of the information recording apparatus. The present invention, however, can be applied to an information recording/reproducing apparatus for rewriting, such as a DVD-RW recorder and a DVD+RW recorder. Moreover, it can be applied to an information recording/reproducing apparatus for large-capacity recording, which uses blue laser for recording/reproduction.

The present invention is not limited to the above-described embodiments, and various changes may be made, if desired, without departing from the essence or spirit of the invention which can be read from the claims and the entire specification. An information recording apparatus and method, and a computer program, all of which involve such changes, are also intended to be within the technical scope of the present invention.

INDUSTRIAL APPLICABILITY

The information recording apparatus and method, and the computer program for recording control according to the present invention can be applied to a multilayer optical disc, such as a dual-layer DVD. Moreover, they can be applied to an information recording apparatus or the like which is mounted on various computer equipment for consumer use or for commercial use, or which can be connected to various computer equipment.

The invention claimed is:

1. An information recording apparatus for recording information into at least a predetermined area of a second recording layer by laser light which has penetrated a penetrated area of a first recording layer, with respect to an information recording medium comprising at least: the first recording layer in which the information can be recorded; and the second recording layer in which the information can be recorded, said information recording apparatus comprising:

a recording device for recording the information in the first recording layer or the second recording layer;

a judging device for judging whether or not an unrecorded amount which indicates a size of radius of an area in an unrecorded state in the penetrated area is smaller than a predetermined amount; and a controlling device for controlling said recording device to record the information into the predetermined area if it is judged that the unrecorded amount is smaller than the predetermined amount, and for controlling said recording device to record the information into the area in the unrecorded state in the penetrated area if it is judged that the unrecorded amount is not smaller than the predetermined amount, said recording device (i) records the information into a first recording area in the second recording layer by the laser light which go through a recorded area in the first recording layer, based on one reproduction quality, and (ii) records the information into a second recording area in the second recording layer by the laser light which go through an unrecorded area in the first recording layer based on another reproduction quality which is substantially same as the one reproduction quality.

2. The information recording apparatus according to claim 1, wherein the predetermined amount is sufficiently smaller than laser irradiation radius.

3. The information recording apparatus according to claim 1, wherein said information recording medium has a management information recording area in which management information, which manage unrecorded state or recorded state per area unit, can be recorded, said information recording apparatus further comprises an obtaining device for obtaining the management information recorded in the management information recording area, and said judging device judges whether or not the unrecorded amount is smaller than the predetermined amount, on the basis of the size of radius of the area in the unrecorded state in the penetrated area which is calculated by the obtained management information.

4. The information recording apparatus according to claim 3, further comprising:
a storing device for storing therein the management information;
an updating device for updating the stored management information; and
an another recording device for recording the updated management information into the management information recording area.

5. The information recording apparatus according to claim 1, wherein the predetermined amount is expressed by a data amount with a radial position in the first or second recording layer as a parameter.

6. The information recording apparatus according to claim 1, wherein the predetermined amount can be determined on the basis of at least one of (i) optical properties and recording features per an individual of said information recording medium, and (ii) variation of optical properties and recording features in a recording area of one information recording medium, and (iii) optical properties and recording features of said information recording medium influenced by various performances of said information recording apparatus.

7. The information recording apparatus according to claim 6, wherein
said recording device or said controlling device includes an optical pickup, and
the optical properties and the recording features of said information recording medium influenced by the various performances of said information recording apparatus are determined on the basis of (i) a numerical aperture of an objective lens owned by the optical pickup, (ii) a refractive index of a middle area which exists between the first recording layer and the second recording layer, and (iii) a laser irradiation diameter in the first recording layer if the laser light is focused on the second recording layer.

8. The information recording apparatus according to claim 1, wherein
a spiral or concentric first track is formed to record the information in the first recording layer of said information recording medium, and a spiral or concentric second track is formed to record the information in the second recording layer, the second track sharing a rotation center with the first track, and
said controlling device controls said recording device to record the information, while setting a radial position of the predetermined area, with a predetermined margin included in a radial position of the penetrated area.

9. The information recording apparatus according to claim 8, wherein a margin amount which indicates a size of the predetermined margin is determined on the basis of at least one of (i) a dimensional error held by each of the first recording layer and the second recording layer, (ii) an eccentric amount caused by a passing error in the first recording layer and the second recording layer, and (iii) an irradiation position error which indicates a difference between (iii-1) a second irradiation position for indicating a radial position of a focus point in the second recording layer and (iii-2) a first irradiation position for indicating a radial position of an edge of the penetrated area which is irradiated with the laser light not to focus thereon, when the laser light is irradiated to focus on the second recording layer.

10. The information recording apparatus according to claim 9, wherein the reproduction quality is represented by at least one of an asymmetry value, a jitter value, and a reproduction error rate.

11. The information recording apparatus according to claim 1, wherein
the predetermined amount is substantially 20 tracks.

12. An information recording method in an information recording apparatus for recording information into at least a predetermined area of a second recording layer by laser light which has penetrated a penetrated area of a first recording layer, with respect to an information recording medium comprising at least: the first recording layer in which the information can be recorded; and the second recording layer in which the information can be recorded,
said information recording method comprising:
a recording process of recording the information in the first recording layer or the second recording layer;
a judging process of judging whether or not an unrecorded amount which indicates a size of radius of an area in an unrecorded state in the penetrated area is smaller than a predetermined amount; and
a controlling process of controlling said recording device to record the information into the predetermined area if it is judged that the unrecorded amount is smaller than the predetermined amount, and of controlling said recording device to record the information into the area in the unrecorded state in the penetrated area if it is judged that the unrecorded amount is not smaller than the predetermined amount,
said recording process (i) records the information into a first recording area in the second recording layer by the laser light which go through a recorded area in the first recording layer, based on one reproduction quality, and (ii) records the information into a second recording area in the second recording layer by the laser light which go through an unrecorded area in the first recording layer based on another reproduction quality which is substantially same as the one reproduction quality.

* * * * *